(12) United States Patent
Sarkar et al.

(10) Patent No.: US 12,556,254 B2
(45) Date of Patent: Feb. 17, 2026

(54) ADAPTIVE BEAM MANAGEMENT IN TELECOMMUNICATIONS NETWORK

(71) Applicant: Telefonaktiebolaget LM Ericsson (publ), Stockholm (SE)

(72) Inventors: Debasish Sarkar, Irvine, CA (US); Ayan Sen, Bangalore (IN); Surajit Mondal, Bangalore (IN); Shikha Singh, Gurgaon (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 511 days.

(21) Appl. No.: 18/028,890

(22) PCT Filed: Oct. 1, 2020

(86) PCT No.: PCT/EP2020/077589
§ 371 (c)(1),
(2) Date: Mar. 28, 2023

(87) PCT Pub. No.: WO2022/069054
PCT Pub. Date: Apr. 7, 2022

(65) Prior Publication Data
US 2023/0262520 A1    Aug. 17, 2023

(51) Int. Cl.
*H04B 7/06* (2006.01)
*H04W 28/08* (2023.01)
*H04W 28/082* (2023.01)

(52) U.S. Cl.
CPC ....... *H04B 7/06952* (2023.05); *H04B 7/0632* (2013.01); *H04W 28/08* (2013.01); *H04W 28/082* (2023.05)

(58) Field of Classification Search
CPC .............. H04B 7/06952; H04B 7/0632; H04B 7/0617; H04W 28/08; H04W 28/082; G06N 5/01; G06N 20/20
See application file for complete search history.

(56) References Cited

U.S. PATENT DOCUMENTS

2020/0259575 A1 * 8/2020 Bai ...................... H04B 7/0862

FOREIGN PATENT DOCUMENTS

WO    WO-2019210953 A1 * 11/2019 ........ H04W 52/0206

OTHER PUBLICATIONS

International Search Report and Written Opinion of the International Searching Authority, PCT/EP2020/077589, mailed Jun. 16, 2021, 19 pages.
(Continued)

*Primary Examiner* — Charles C Jiang
*Assistant Examiner* — Rachel Elizabeth Marks
(74) *Attorney, Agent, or Firm* — Sage Patent Group

(57) ABSTRACT

A computer-implemented method for adaptive beam management for load balancing communication devices over ports used for a channel state information reference signal, CSI-RS, in a telecommunications network. The method includes predicting from a machine learning model predicted channel quality indicator, CQI, values for target beam candidates for offloading one or more communication devices. The method includes identifying a target beam candidate having a highest CQI value from the predicted CQI values. The method includes deciding to offload the one or more communication devices from an offload beam candidate to the target beam candidate when a difference between the highest CQI value of the target beam candidate and a CQI value of the offload beam candidate is greater than or equal to a threshold value. The method includes initiating offloading of the one or more communication devices from the offload beam candidate to the target beam candidate.

18 Claims, 17 Drawing Sheets

(56) References Cited

OTHER PUBLICATIONS

Ekman, Björn, "Machine Learning for Beam Based Mobility Optimization in NR", Master of Science Thesis in Communication Systems, 2017, Linkoping University, Sweden, 85 pages.
Chiumento, Alessandro, "Dynamic Resource Allocation and Self-Organizing Signalling Optimisation in LTE-A Downlink", Dissertation for Doctor of Engineering, Oct. 2015, KU Leuven, 164 pages.

\* cited by examiner

| BID 301 | UE$_{tot}$ 303 | CQI 305 | UL SINR 307 | DATAVOL 309 |
|---|---|---|---|---|
| 4 | 1 | 6.00 | -9.44 | 0.00 |
| 5 | 1 | 14.00 | 9.54 | 0.01 |
| 6 | 1 | 10.00 | -9.83 | 0.01 |
| 3 | 1 | 8.00 | 1.74 | 0.02 |
| 6 | 1 | 12.00 | 19.80 | 0.02 |
| 15 | 1 | 9.00 | 38.67 | 0.02 |
| 10 | 1 | 15.00 | 30.10 | 0.03 |
| 3 | 1 | 5.00 | -6.80 | 0.03 |
| 4 | 1 | 11.00 | 43.68 | 0.03 |
| 4 | 1 | 6.00 | 24.86 | 0.04 |
| 3 | 1 | 6.00 | 32.94 | 0.05 |
| 4 | 1 | 14.00 | 26.55 | 0.05 |
| 13 | 1 | 6.00 | 3.91 | 0.06 |
| 2 | 1 | 6.00 | 23.04 | 0.06 |
| 10 | 1 | 13.00 | 33.68 | 0.06 |
| 4 | 1 | 3.00 | 48.80 | 0.06 |
| 4 | 1 | 9.00 | 3.22 | 0.06 |
| 3 | 1 | 13.00 | 43.07 | |
| 12 | 1 | 3.00 | | |
| 10 | 1 | 9.00 | | |
| | 1 | | | |

Beam Report Table 300

| BID 301 | UE$_{tot}$ 303 | CQI 305 | UL SINR 307 | DATAVOL 309 |
|---|---|---|---|---|
| 4 | 1 | 6.00 | -9.44 | 0.00 |
| 5 | 1 | 14.00 | 9.54 | 0.01 |
| 6 | 1 | 10.00 | -9.83 | 0.01 |
| 3 | 1 | 8.00 | 1.74 | 0.02 |
| 6 | 1 | 12.00 | 19.80 | 0.02 |
| 15 | 1 | 9.00 | 38.67 | 0.02 |
| 10 | 1 | 15.00 | 30.10 | 0.03 |
| 3 | 1 | 5.00 | -6.80 | 0.03 |
| 4 | 1 | 11.00 | 43.68 | 0.03 |
| 4 | 1 | 6.00 | 24.86 | 0.04 |
| 3 | 1 | 6.00 | 32.94 | 0.05 |
| 4 | 1 | 14.00 | 26.55 | 0.05 |
| 13 | 1 | 6.00 | 3.91 | 0.06 |
| 2 | 1 | 6.00 | 23.04 | 0.06 |
| 10 | 1 | 13.00 | 33.68 | 0.06 |
| 4 | 1 | 3.00 | 48.80 | 0.06 |
| 4 | 1 | 9.00 | 3.22 | 0.06 |
| 3 | 1 | 13.00 | 43.07 | |
| 12 | 1 | 3.00 | | |
| 10 | 1 | 9.00 | | |
| 3 | 1 | | | |

Beam id 4, 6 & 10 are Identified as beams to be offloaded with T1_Offload_Quantity 19, 23 & 21 respectively Aggregated Table 700

| BID 301 | UE$_{count,bi}$ 701 | CQI$_{avg}$ 703 | UL SINR$_{avg}$ 705 | DATAVOL sum 707 | Z-Score 709 | Z-Score 75th 711 | T1_Decision 713 | Mean Users Per Beam 715 | T1_Offload_Quantity 715 |
|---|---|---|---|---|---|---|---|---|---|
| 2 | 35 | 9.14 | 16.16 | 19.77 | 0.594 | 0.824 | 0 | 25 | 0 |
| 3 | 37 | 7.27 | 21.22 | 19.10 | 0.716 | 0.824 | 0 | 25 | 0 |
| 4 | 44 | 8.50 | 19.46 | 19.00 | 1.146 | 0.824 | 1 | 25 | 19 |
| 5 | 22 | 9.64 | 23.17 | 10.98 | -0.205 | 0.824 | 0 | 25 | 0 |
| 6 | 48 | 8.17 | 21.84 | 25.53 | 1.392 | 0.824 | 1 | 25 | 23 |
| 7 | 3 | 13.33 | 26.51 | 1.62 | -1.371 | 0.824 | 0 | 25 | 0 |
| 10 | 46 | 8.72 | 20.96 | 16.67 | 1.269 | 0.824 | 1 | 25 | 21 |
| 11 | 6 | 5.67 | 22.81 | 3.60 | -1.187 | 0.824 | 0 | 25 | 0 |
| 12 | 29 | 7.45 | 18.76 | 16.34 | 0.225 | 0.824 | 0 | 25 | 0 |
| 13 | 4 | 3.00 | 15.66 | 1.52 | -1.310 | 0.824 | 0 | 25 | 0 |
| 14 | 22 | 8.41 | 19.04 | 9.45 | -0.205 | 0.824 | 0 | 25 | 0 |
| 15 | 8 | 5.38 | 16.40 | 4.14 | -1.064 | 0.824 | 0 | 25 | 0 |

| 301 | 303 | 305 | 307 | 309 | CQI Scaled 901 | SINR Scaled 903 | VOL Scaled 905 | Cost 907 |
|---|---|---|---|---|---|---|---|---|
| 2 | 1 | 4 | -9.37 | 0.58 | 0.79 | 1.00 | 0.56 | 0.78 |
| 2 | 21 | 4 | 9.89 | 0.78 | 0.79 | 0.68 | 0.78 | 0.76 |
| 2 | 13 | 3 | 27.90 | 0.83 | 0.86 | 0.37 | 0.84 | 0.73 |
| 2 | 14 | 1 | 13.48 | 0.30 | 1.00 | 0.61 | 0.27 | 0.72 |
| 2 | 5 | 2 | 2.87 | 0.23 | 0.93 | 0.79 | 0.19 | 0.71 |
| 2 | 10 | 5 | 12.49 | 0.58 | 0.71 | 0.63 | 0.56 | 0.66 |
| 2 | 27 | 2 | 17.46 | 0.13 | 0.93 | 0.55 | 0.08 | 0.62 |
| 2 | 28 | 5 | 0.20 | 0.23 | 0.71 | 0.84 | 0.19 | 0.61 |
| 2 | 9 | 8 | 15.01 | 0.78 | 0.50 | 0.59 | 0.78 | 0.59 |
| 2 | 17 | 11 | 3.09 | 0.95 | 0.29 | 0.79 | | |
| 2 | 11 | 12 | -7.63 | 0.89 | 0.21 | | | |
| 2 | 12 | 8 | 3.14 | 0.44 | | | | |

Top N UEs selected from the list where N = T1_Offload_Quantity

Descending Cost

Figure 9

Predict from ML model a plurality of predicted CQI values for a plurality of target beam candidates, respectively, for offloading one or more communication devices 1701

Identify a target beam candidate from the plurality of target beam candidates having a highest CQI value from the plurality of predicted CQI values 1703

Decide to offload the one or more communication devices from an offload beam candidate to the target beam candidate when a difference between the highest CQI value of the target beam candidate and a CQI value of the offload beam candidate is greater than or equal to a threshold value 1705

Initiate offloading of the one or more communication devices from the offload beam candidate to the target beam candidate 1707

Figure 17

ADAPTIVE BEAM MANAGEMENT IN TELECOMMUNICATIONS NETWORK

CROSS REFERENCE TO RELATED APPLICATIONS

This application is a 35 U.S.C. § 371 national stage application of PCT International Application No. PCT/EP2020/077589 filed on Oct. 1, 2020, the disclosure and content of which is incorporated by reference herein in its entirety.

TECHNICAL FIELD

The present disclosure relates generally to computer-implemented methods for adaptive beam management for load balancing a plurality of communication devices over ports used for a channel state information reference signal (CSI-RS) in a telecommunications network (network), and related methods and apparatuses.

BACKGROUND

Beam management can include a process of acquiring and maintaining a transmission beam from a gNodeB (gNB) and a user equipment (UE) that can be used for downlink (DL) and uplink (UL) transmission/reception. In some approaches, beam acquisition can include three operations, as illustrated in FIG. 1.

Referring to FIG. 1, first operation 101 can include an initial transmission beam sweep. Before a data flow is started, a set of broad beams are probed with synchronization signal block (SSB) in an interval (e.g., SSB periodicity) to determine a best reported synchronization beam. Prior to initiation of a physical random access procedure, Layer 1 receives from higher layers a set of synchronization signal/physical broadcast channel (SS/PBCH) block indices and provides to higher layers a corresponding set of reference signal received power (RSRP) measurements. The measurements can be used to decide a suitable wide beam that can be used by the communication device in DL. A beam measurement process for Idle mode can be based on synchronization signal (SS) Blocks, and for dedicated mode can be based on CSI-RS in DL and sounding reference signals (SRS) in UL. The CSI-RS measurement can also be used for mobility management purposes.

Second operation 103 can include a transmission beam sweep for refinement. A narrow beam(s) closest to a broad beam in a beam grid can be selected to be probed using CSI-RS, which can be followed by CSI-RS measurements. Based on the measurement report, a suitable narrow beam can be identified by gNB 100 and informed to a UE 102.

Third operation 105 can include UE 102 receiving beam refinement. After receiving information about a suitable narrow beam from gNB 100, UE 102 can sweep its receiving (Rx) beams and find a best Rx beam.

After completion of the beam acquisition, data can be scheduled to a communication device on physical downlink shared channel (PDSCH). To maintain the transmission to a specific UE 102, gNB 100 should be aware of the quality of the physical layer and, if required, gNB 100 can take a decision on changing or switching the narrow (CSI-RS) or both narrow (CSI-RS) and wide beam (SSB). The decision can be based on the beam related measurement report provided by UE 102 and can contain RSRP measurements for a specific combination of physical cell identity (PCI), SSB index, and CSI-RS index. For SS-RSRP, determination of demodulation reference signals (DMRS) for physical broadcast channel (PBCH) and, if indicated by higher layers, CSI-RS in addition to secondary synchronization signals may be used.

Based on the measurement report, gNB 100 can decide to change the narrow beam. FIG. 2 is a diagram illustrating an approach of switching the beams, with operations shown on the left side of FIG. 2 and diagrams illustrating transmission/reception of the right side of FIG. 2.

Still referring to FIG. 2, when a network (e.g., gNB 100) decides to change or switch the beam for a UE (e.g., UE 102), a new transmission configuration indicator (TCI) state can be indicated to the UE for a specific narrow CSI-RS beam as the spatially quasi-colocation(QCL) with the physical downlink control channel (PDCCH) and/or PDSCH DMRS. UE 102 can acknowledge this indication and can sweep its Rx beams to find its best Rx beam.

Such beam acquisition may result in active communication devices being poorly distributed over beams. Additionally, while changing or switching serving beams, only measured RSRP of target candidate beams may be used for evaluation and decision. There remains a need for improved distribution of active communication devices overs beams and improved (or maintained) end-user experience after beam switching.

SUMMARY

In various embodiments, operations of a computer-implemented method performed by a network node is provided for adaptive beam management for load balancing a plurality of communication devices over ports used for a channel state information reference signal, CSI-RS, in a telecommunications network. The method includes predicting from a machine learning model a plurality of predicted channel quality indicator, CQI, values for a plurality of target beam candidates, respectively, for offloading one or more communication devices from the plurality of communication devices. The method further includes identifying a target beam candidate from the plurality of target beam candidates having a highest CQI value from the plurality of predicted CQI values. The method further includes deciding to offload the one or more communication devices from an offload beam candidate to the target beam candidate when a difference between the highest CQI value of the target beam candidate and a CQI value of the offload beam candidate is greater than or equal to a threshold value. The method further includes, responsive to the deciding, initiating offloading of the one or more communication devices from the offload beam candidate to the target beam candidate.

In various embodiments, a network node is provided for adaptive beam management for load balancing a plurality of communication devices over ports used for a channel state information reference signal, CSI-RS, in a telecommunications network. The network node includes at least one processor, and at least one memory connected to the at least one processor and storing program code that is executed by the at least one processor to perform operations. The operations include predicting from a machine learning model a plurality of predicted channel quality indicator, CQI, values for a plurality of target beam candidates, respectively, for offloading one or more communication devices from the plurality of communication devices. The operations further include identifying a target beam candidate from the plurality of target beam candidates having a highest CQI value from the plurality of predicted CQI values. The operations further include deciding to offload the one or more communication devices from an offload beam candidate to the target beam candidate when a difference between the highest CQI value of the target beam candidate and a CQI value of the offload beam candidate is greater than or equal to a threshold value. The operations further include, responsive to the deciding, initiating offloading of the one or more communication devices from the offload beam candidate to the target beam candidate.

In various embodiments, a network node is provided for adaptive beam management for load balancing a plurality of communication devices over ports used for a channel state information reference signal, CSI-RS, in a telecommunications network. The network node is adapted to perform operations. The operations include predicting from a machine learning model a plurality of predicted channel quality indicator, CQI, values for a plurality of target beam candidates, respectively, for offloading one or more communication devices from the plurality of communication devices. The operations further include identifying a target beam candidate from the plurality of target beam candidates having a highest CQI value from the plurality of predicted CQI values. The operations further include deciding to offload the one or more communication devices from an offload beam candidate to the target beam candidate when a difference between the highest CQI value of the target beam candidate and a CQI value of the offload beam candidate is greater than or equal to a threshold value. The operations further include, responsive to the deciding, initiating offloading of the one or more communication devices from the offload beam candidate to the target beam candidate.

In various embodiments, a computer program including program code to be executed by processing circuitry of a network node is provided. The program code causes the network to perform operations including predicting from a machine learning model a plurality of predicted channel quality indicator, CQI, values for a plurality of target beam candidates, respectively, for offloading one or more communication devices from the plurality of communication devices. The operations further include identifying a target beam candidate from the plurality of target beam candidates having a highest CQI value from the plurality of predicted CQI values. The operations further include deciding to offload the one or more communication devices from an offload beam candidate to the target beam candidate when a difference between the highest CQI value of the target beam candidate and a CQI value of the offload beam candidate is greater than or equal to a threshold value. The operations further include, responsive to the deciding, initiating offloading of the one or more communication devices from the offload beam candidate to the target beam candidate.

In various embodiments, a computer program product including a non-transitory storage medium including program code to be executed by processing circuitry of a network node is provided. Execution of the program code causes the network node to perform operations. The operations include predicting from a machine learning model a plurality of predicted channel quality indicator, CQI, values for a plurality of target beam candidates, respectively, for offloading one or more communication devices from the plurality of communication devices. The operations further include identifying a target beam candidate from the plurality of target beam candidates having a highest CQI value from the plurality of predicted CQI values. The operations further include deciding to offload the one or more communication devices from an offload beam candidate to the target beam candidate when a difference between the highest CQI value of the target beam candidate and a CQI value of the offload beam candidate is greater than or equal to a threshold value. The operations further include, responsive to the deciding, initiating offloading of the one or more communication devices from the offload beam candidate to the target beam candidate.

In some approaches, active communication devices may be poorly distributed over beams. Additionally, while changing or switching serving beams, only measured RSRP of target candidate beams may be used for evaluation and decision. Potential advantages of disclosed embodiments may include distributing active communication devices over physical ports used for CSI-RS as a consequence of reducing bias on UE reported beam indexes and considering additional metrics that may have influence on improving (or maintaining) end-user experience and system performance post switch of the serving beam.

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings:

FIG. 3 is an exemplary Beam Report Table in accordance with some embodiments of the present disclosure;

FIG. 7 is a schematic of an exemplary embodiment of a result of identification of offload beam candidates in accordance with some embodiments of the present disclosure;

FIG. 9 is a table illustrating an exemplary embodiment of identification of specific communication devices that can be offloaded from the offload beam candidates in accordance with some embodiments of the present disclosure;

FIGS. 17-18 are flow charts illustrating operations of a network node in accordance with some embodiments of the present disclosure.

DETAILED DESCRIPTION

Figure 1:
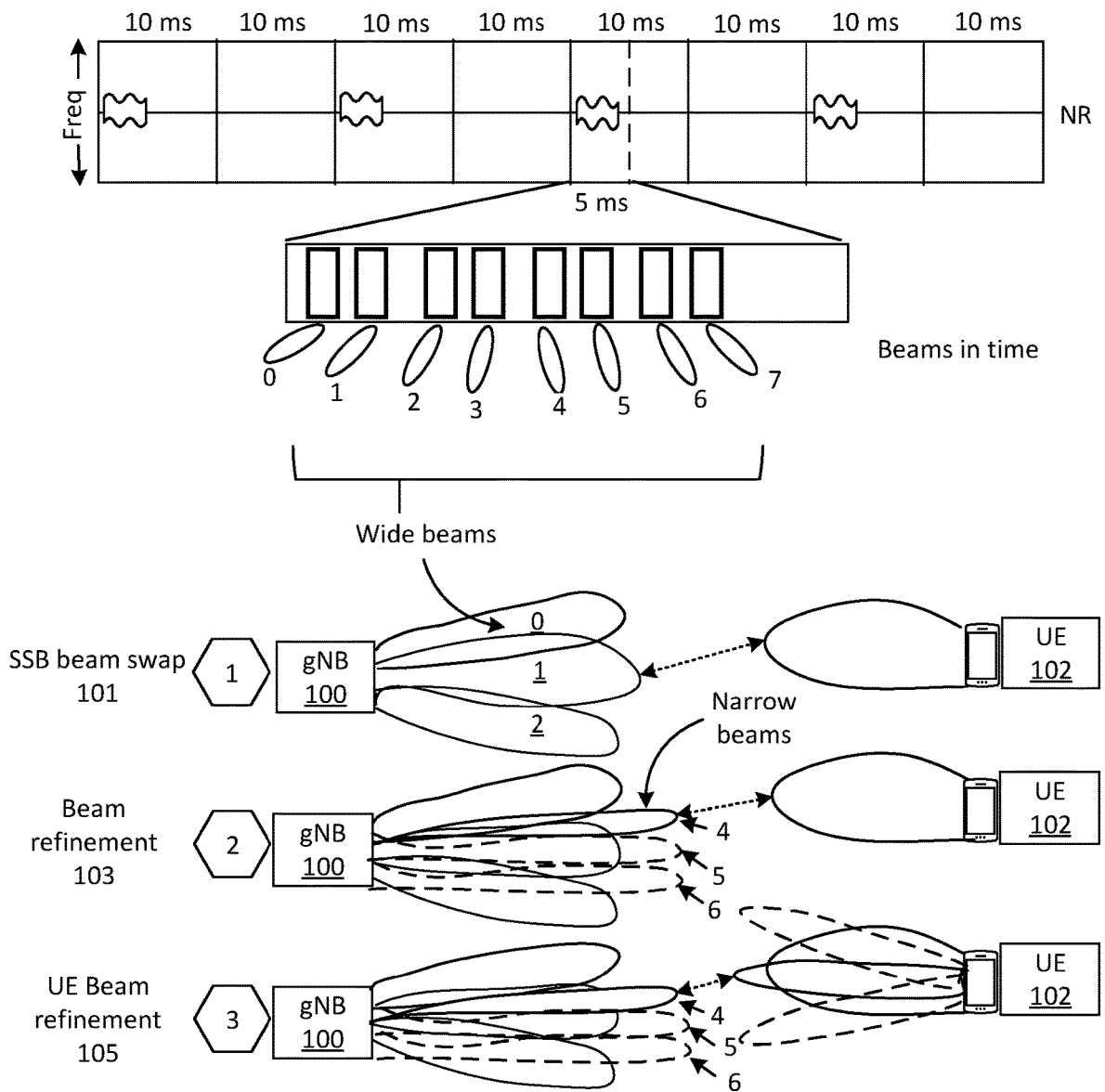
FIG. 1 is a diagram illustrating a beam acquisition approach.
Figure 2:
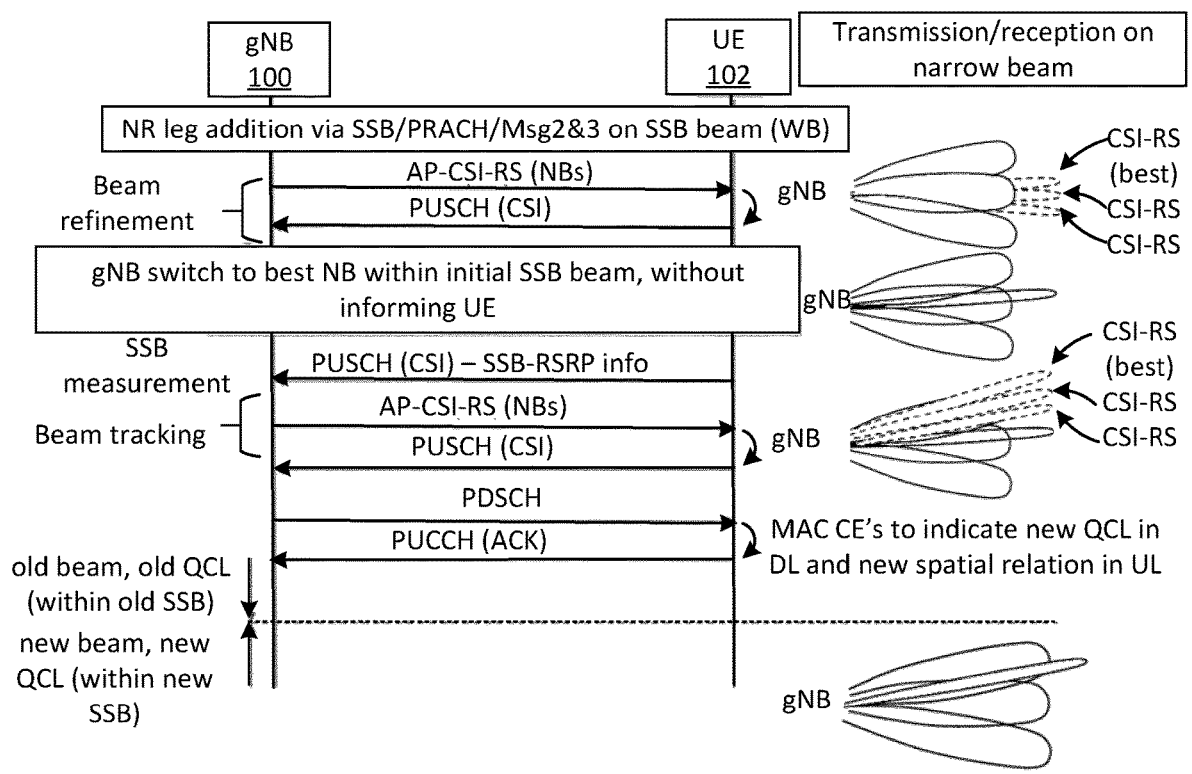
FIG. 2 is a diagram illustrating an approach of switching the beams.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The term "communication device" is used in a non-limiting manner and, as explained below, can refer to any type of user equipment (UE). The terms "user equipment", "UE", and/or "user" herein may be interchangeable and replaced with the term "communication device". Further, the term "network node" is used in a non-limiting manner and, as explained below, can refer without limitation to any type of network node in a telecommunications network including, without limitation, a gNB.

The following explanation of potential problems with some approaches is a present realization as part of the present disclosure and is not to be construed as previously known by others.

With an increase in active communication devices served by a new radio (NR) node, to maintain optimal or improved throughput for a communication device it can be very important to allocate physical resources efficiently. Currently, CSI-RS and an associated measurement is used to determine a communication device location on home and visiting planes. PDSCH is accordingly beamformed in the specific direction of the communication device. A gNB can have a limited number of physical ports for CSI-RS which are mapped logically to multiple CSI-RS resources.

When a NR cell is loaded with many communication devices, it is possible that one CSI-RS beam can be reported by many communication devices, while other CSI-RS beams can be reported by few communication devices. In such a scenario of non-uniform distribution of communication devices over CSI-RS resources, some CSI-RS beams can be used more frequently to schedule PDSCH, compared to other CSI-RS beams. As there is a specific periodicity of transmission of CSI-RS beams, and CSI-RS beams are mapped to specific physical ports, using CSI-RS beams non-uniformly among active communication devices can impact the scheduling opportunity of some communication device(s) resulting into reduced DL user throughput.

Additionally, currently while changing or switching serving beams, measured RSRP of target candidate beams are used for evaluation and decision. However, in this approach based on RSRP only, switching the beam may not result in an improvement in user throughput or at least maintain the same level of performance with respect to user experience.

The measurement reporting of beams is a communication device side implementation and can vary a lot depending on the communication device vendor and chipset used in the communication device. However, some test results show, if a gNB completely relies on this report without applying any local intelligence, the performance can vary depending on the communication device vendor and communication device side implementation, irrespective of the radio frequency (RF) environment of the communication device.

Network product vendors may need to ensure the best 5G performance for customers and to include functionality that may address the potential problems described herein.

Various embodiments of the present disclosure may provide solutions to these and other potential problems. In various embodiments of the present disclosure, a machine learning (ML) based method is provided to distribute active communication devices over physical ports used for CSI-RS. The method may influence the beam switch decision considering additional metrics that may not only ensure more efficient resource utilization but may also improve (or maintain) the end-user experience and system performance post switch of the serving beam.

Various embodiments of the present disclosure can include the following operations: (1) Identification of loaded beams based on scheduling intensity (referred to herein as operation A); (2) Identification of specific communication devices that can be offloaded to other beams through a network-initiated beam switch (referred to herein as operation B); and (3) Identification of appropriate target beam candidates where communication devices can be offloaded for optimal (or maintained or improved) system performance (referred to herein as operation C).

Potential advantages provided by various embodiments of the present disclosure may include enhanced user experience by performing efficient and appropriate allocation of resources through offloading a communication device to an alternate beam from a comparable user throughput perspective. Additional potential advantages may include improved overall system performance in terms of cell throughput; pre-switch evaluation of target beam candidates considering additional metrics may ensure post-switch user level and overall system performance; and local built-in ML based intelligence may allow an effective informed decision during beam switch and not influenced solely by specific behavior of a communication device.

While various embodiments are described with reference to a configuration in a new radio (NR) network including a gNB, a Beam Report Table, and a machine learning (ML) model comprising a Random Forest Regressor, the invention is not so limited, and includes other configurations. Instead, network nodes other than a gNB may be used (as discussed herein). Additionally, a Beam Report Table is not limited to a table. Instead, other formats of data may be used including, without limitation, data stored in memory, a dictionary, etc. A ML model may comprise different ML models including, without limitation, a neural network, etc.

Operations A-C of the method of various embodiments of the present disclosure will now be discussed further.

Identification of loaded beams based on scheduling intensity can be performed in operation A. A table (or other data format), referred to herein as a Beam Report Table, can be maintained containing, without limitation, the following instantaneous information: (a) PCI identifying a NR cell within a gNB; (b) a narrow beam index; (c) a number of communication devices served by a narrow beam index; (d) a reported CQI by a communication device; (e) an UL signal to interference plus noise ratio (SINR) measured by a gNB; and (f) aggregated DL/UL data volume scheduled for a communication device, etc. The Beam Report Table (or other data format) can be maintained in a gNB or in another device communicatively connected to the gNB.

FIG. 3 is an exemplary Beam Report Table in accordance with some embodiments of the present disclosure. Beam Report Table 300 illustrates an excerpt of data for a PCI for a gNB. The exemplary data includes five columns of data as follows: Beam index identification (BID) 301 identifying a narrowband beam index by a numerical value (e.g., 2, 3, 4, etc.); $UE_{tot}$ 303 identifies a number of communication devices served by a BID 301 of a corresponding row of Beam Report Table 300; CQI 305 identifies a reported CQI by the communication device in the corresponding row of Beam Report Table 300; UL SINR 307 identifies an UL SINR measured by the gNB for the corresponding entries of a row of Beam Report Table 300; DATAVOL 309 identifies aggregated DL/UL data volume schedule for the communication device of a corresponding row of Beam Report Table 300.

Figure 4:
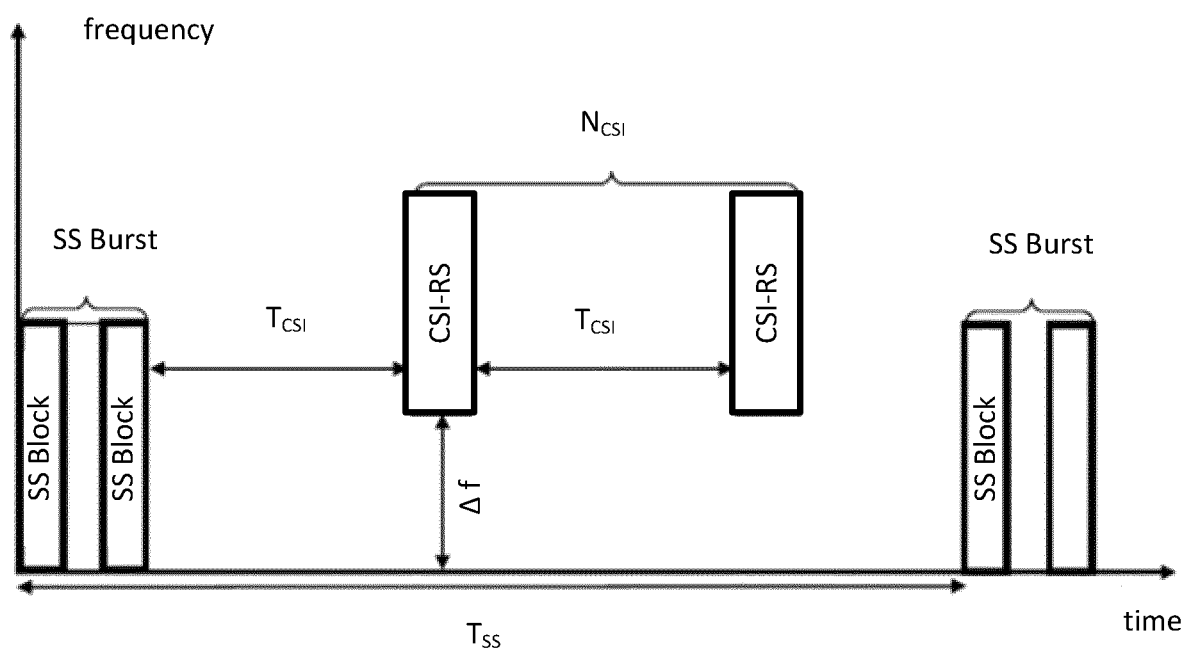
FIG. 4 is a diagram illustrating a time gap, e.g. TCSI, between two continuous CSI and a Beam Report Table update periodicity in accordance with some embodiments of the present disclosure.

Beam Report Table 300 can be periodically updated by the gNB with an interval of $n*T_{csi}$, where "n" is a configurable integer type parameter and $T_{csi}$ is a time gap between two consecutive CSIs, as shown in FIG. 4.

Figure 5:
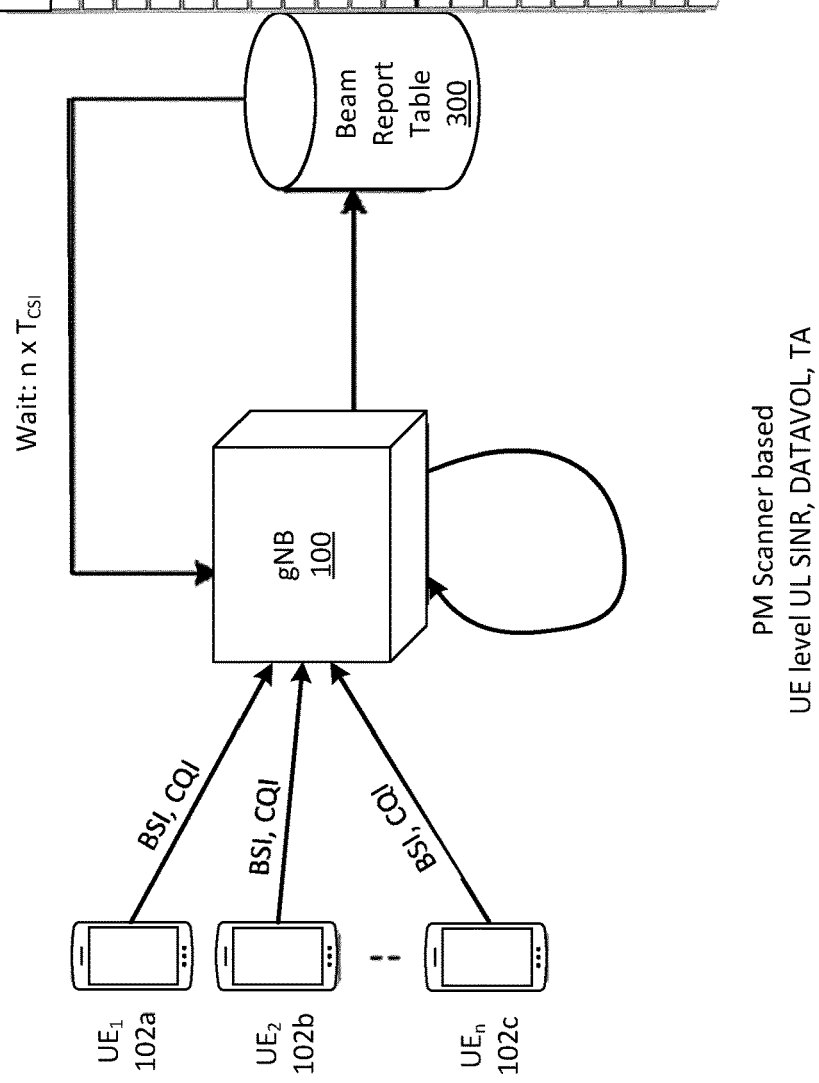
FIG. 5 is a schematic illustrating an exemplary embodiment of preparation of a Beam Report Table in accordance with some embodiments of the present disclosure.

FIG. 5 is a schematic illustrating an exemplary embodiment of preparation of a Beam Report Table in accordance with some embodiments of the present disclosure. gNB 100 periodically updates Beam Report Table 300 (e.g., at interval $n*T_{csi}$) with data from UEs 102 (e.g. BID 301 and corresponding $UE_{tot}$ 303 and CQI 305) and other data (e.g., collected using a performance management (PM) scanner to obtain UE level UL SINR 307 and DATAVOL 309.

Identification of whether there are beams that can be offloaded (referred to herein as "offload beam candidates") is now discussed.

At any evaluation instance, gNB 100 can operate to identify whether there is a possibility to offload one or more offload beam candidates. Using data available in the Beam Report Table 300 (or other data format), gNB 100 can derive a decision value. In some embodiments, the decision value can be determined as follows:

T1_Decision=If $Z_{score}(UE_{count,bi})>[Z_{score,bis}]$·quantile (0.75) then 1 else 0

Where $Z_{score}(UE_{count,bi})$ is the Z-Score of BI 301 with $UE_{count,bi}$ as the active number of communication devices. $Z_{score,bis}$ is the series of Z-Scores for the series of $UE_{count,bi}$ from all BIDs 301.

Beams identified with a value T1_Decision=1, are offload beam candidates. A quantity of communication devices to be offloaded (referred to herein as T1_Offload_Quantity), from the offload beam candidates having T1_Decision=1, can be determined as follows:

T1_Offload_Quantity=If T1_Decision==1
then $(UE_{count,bi}-\text{Mean}(UE_{count,bi}))$ else 0.

Where, $UE_{count,bi}$ is a total number of active communication devices served by a specific beam.

Figure 6:
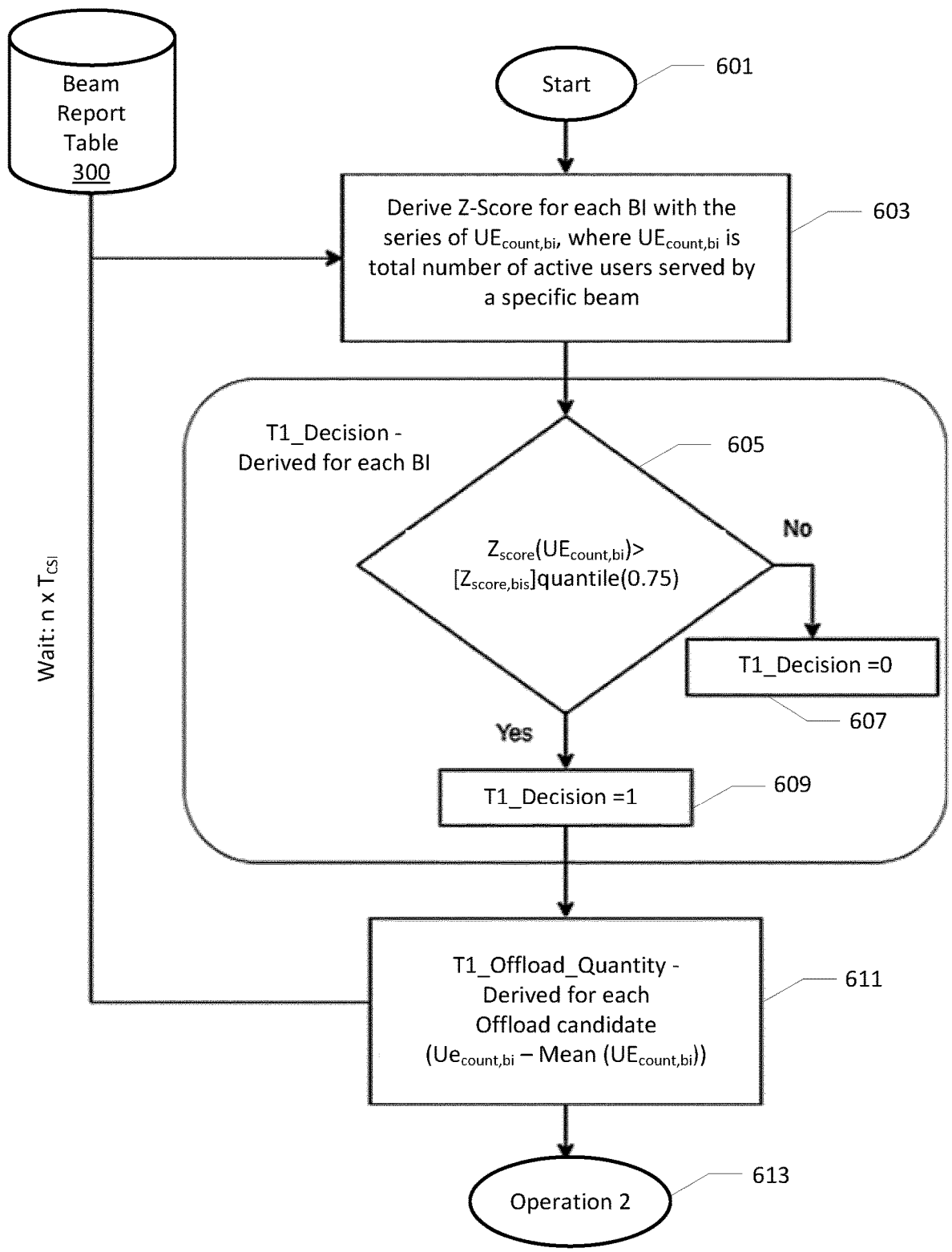
FIG. 6 is a flow chart of an exemplary embodiment of identification of offload beam candidates in accordance with some embodiments of the present disclosure.

FIG. 6 is a flow chart of an exemplary embodiment of identification of offload beam candidates in accordance with some embodiments of the present disclosure. At 601, operations to identify offload beam candidates start. At 603, using data from Beam Report Table 300, gNB 100 derives a Z-score for each beam index in the series of $UE_{count,bi}$. Operations 605-609 can be performed to derive a decision value for each BID 301. At operation 605, the series of Z-scores from operation 603 are used to determine the decision value based on T1_Decision=If $Z_{score}(UE_{count,bi})>[Z_{score,bis}]$·quantile(0.75) then 1 else 0. Beams identified with a value T1_Decision=1, are offload beam candidates; and beams identified with a value T1_Decision=0 are not offload beam candidates. If the T1_Decision value is 0, the operations of FIG. 6 end for that beam index in the series of $UE_{count,bi}$.

If the T1_Decision value is 1, operation 611 is performed. In operation 611, a quantity of communication devices to be offloaded (T1_Offload_Quantity), from the offload beam candidates having T1_Decision=1, can be determined for each offload beam candidate, as follows: T1_Offload_Quantity=If T1_Decision==1 then $(UE_{count,bi}-\text{Mean}(UE_{count,bi}))$ else 0. The result of operation 611 is provided to Beam Report Table 300. At operation 613, the second operation of various embodiments of the present disclosure can begin.

FIG. 7 is a schematic of an exemplary embodiment of a result of identification of offload beam candidates (e.g., from FIG. 6) in accordance with some embodiments of the present disclosure. As discussed with reference to FIG. 6, data from Beam Report Table 300 can be used to identify beams having a value T1_Decision=1 (i.e., offload beam candidates). For the identified offload beam candidates, a quantity of communication devices to be offloaded (T1_Offload_Quantity) can be determined. The result, and values identified in determining the result, can be stored in aggregated table 700 (or any other data format). Aggregated table 700 includes: BID 301, $UE_{cont,bi}$, $CQI_{avg}$ 703; UL $SINR_{avg}$ 705, $DATAVOL_{sum}$ 707; Z-scores 709; Z-score 3rd quartile 711; T1_Decision 713; Mean users per beam 715; and T1_Offload_Quantity 715. As illustrated in aggregated table 700, the beams identified as beams 4, 6, and 10 in the BID 301 column are identified as beams to be offloaded (see entries in corresponding row for T1_Decision 713) with T1_Offload_Quantities 715 of 19, 23 and 21, respectively.

Identification of specific communication devices that can be offloaded to other beams through a network-initiated beam switch can be performed in operation B.

In operation B, gNB 100 identifies a specific set of communication devices that can be offloaded from offload beam candidates by, e.g., applying a cost function (denoted herein as UeCostFunc) on each of the communication devices served by the offload beam candidates. The cost function can be as follows:

def UeCostFunc (CQIue,UL_SINRue,DATAVOLue):

return (0.5*NegOrientedScale (CQIue)+(0.25*NegOrientedScale (UL_SINRue)+(0.25*PosOrientedScale (DATAVOLue))

where

NegOrientedScale is Negative-oriented normalization of a metric values based on population. E.g., the lower the CQI, the higher the cost.

PosOrientedScale is Positive-oriented normalization of a metric based on population. E.g., the higher the data volume, the higher the cost.

A TOP N UEs can be selected based on calculated cost, where N=T1_Offload_Quantity for a specific offload beam candidate.

Figure 8:
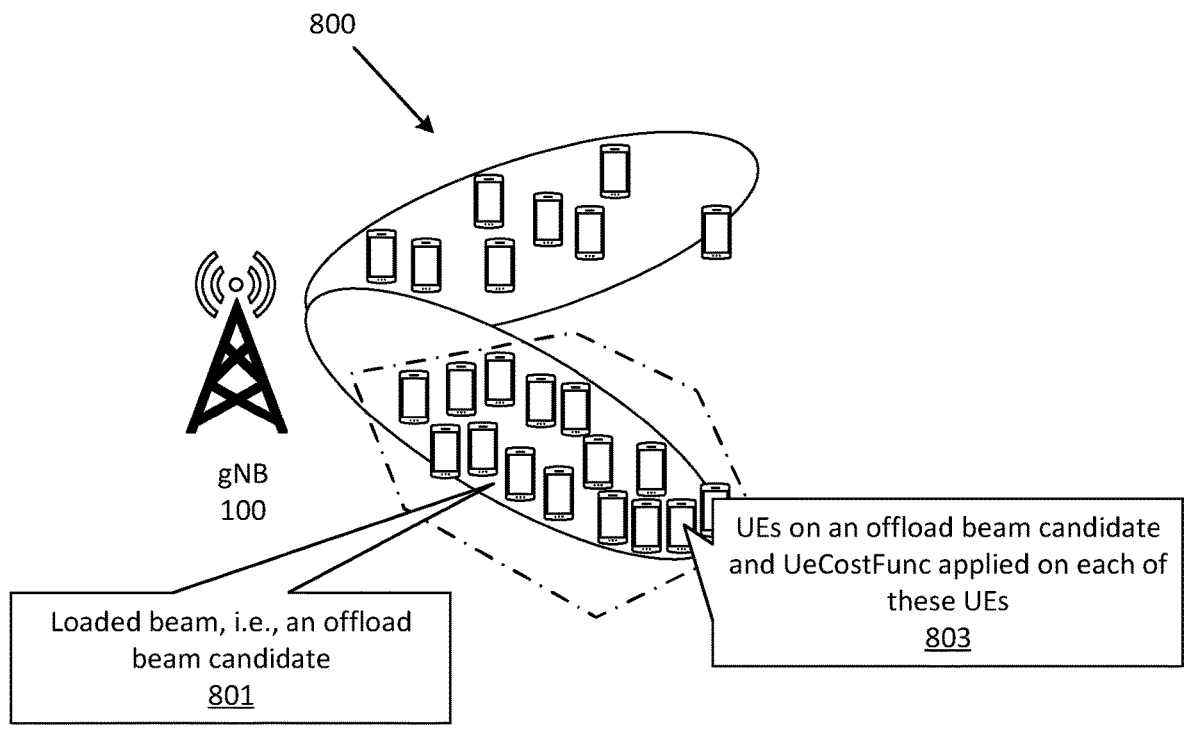
FIG. 8 is a diagram illustrating an exemplary embodiment of an identified offload beam candidate and served communication devices in accordance with some embodiments of the present disclosure.

FIG. 8 is a diagram 800 illustrating an exemplary embodiment of an identified offload beam candidate and served communication devices in accordance with some embodiments of the present disclosure. A plurality of UEs 102 are on a loaded beam 801 (i.e., an offload beam candidate). A UeCostFunc is applied on each of the plurality of UEs 102 on offload beam candidate 801.

FIG. 9 is a table illustrating an exemplary embodiment of identification of specific communication devices that can be offloaded from the offload beam candidates in accordance with some embodiments of the present disclosure. In the exemplary embodiment of FIG. 9, specific communication devices 102 are identified that can be offloaded from an offload beam candidate (e.g., relatively loaded beams). For the identified offload beam candidate 2 in the BID 301 column, the Top N UEs 102 can be selected from the table, where N is equal to the T1_Offload_Quantity, beginning with the UE 102 have the highest cost through UE N in order of descending cost.

Figure 10:
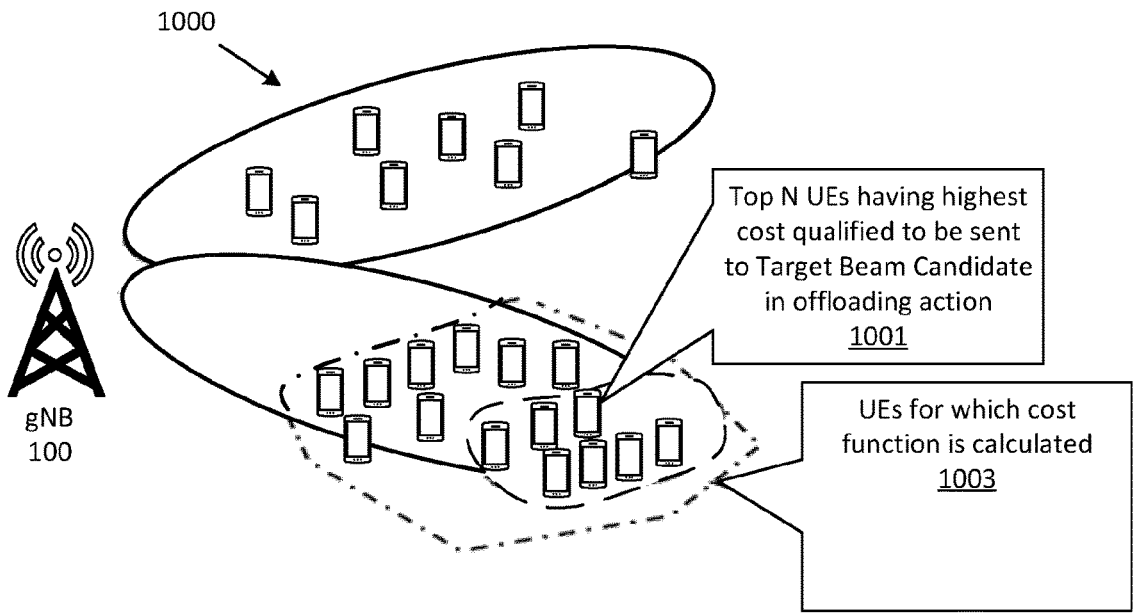
FIG. 10 is a diagram illustrating identification of specific communication devices that can be offloaded to other beams through a network-initiated beam switch in accordance with some embodiments of the present disclosure.

FIG. 10 is a diagram 1000 illustrating identification of specific communication devices that can be offloaded to other beams through a network-initiated beam switch in accordance with some embodiments of the present disclosure. In the exemplary embodiment of FIG. 10, communication devices for which a cost function is calculated are shown within area 1003 of an offload beam candidate. Specific of those communication devices 102 are identified as the Top N communication devices having the highest cost qualified to be sent to another beam ID (i.e., a target beam candidate) in an offloading action, as illustrated in sub-area 1001.

Identification of target beam candidates where communication devices can be offloaded for optimal, improved, or maintained system performance can be performed in operation C.

In operation B discussed above, the network identifies specific communication devices that can be offloaded, and the network is also aware of the beam indexes (i.e. offload beam candidates) from the which this offload can happen. In a third operation, the network can identify suitable target beams (referred to herein as target beam candidates), where the identified communication devices can be offloaded.

In doing that, in some embodiments, the network (e.g., a network node such as gNB 100) can perform the following simultaneously or sequentially for each communication device 102 served by the offload beam candidates:

1. Collect the communication device reported beam status indicator (BSI) that contains $RSRP_{target\_bi,ue}$ of measured beam indexes.
2. Collect the communication device reported CQI for the serving beam (denoted by $CQI_{serving\_bi,ue}$)
3. Collect the communication device reported Timing Advance ($TA_{ue}$).
4. Remove all the offload beam candidates (identified in operation A discussed above), from above list.
5. If any target candidate(s) (beam IDs) are available, after filtering in the previous operation (i.e., number 4 above):
Predict CQI of target candidates using a ML model.
Identify target candidate with highest CQI (denoted by $CQI_{target\_bi,ue}$).
If $(CQI_{target\_bi,ue} - CQI_{serving\_bi,ue}) >= Thresh_{offload}$, then initiate offload (or beam switch) of the selected communication device to the target candidate;
Else no action taken on that communication device.

$Thresh_{offload}$ is a minimum value of a difference between $CQI_{target\_bi,ue}$ and $CQI_{serving\_bi,ue}$ which may help ensure performance after beam switch. $Thresh_{offload} >= 0$ can be used during the implementation.

Figure 11:
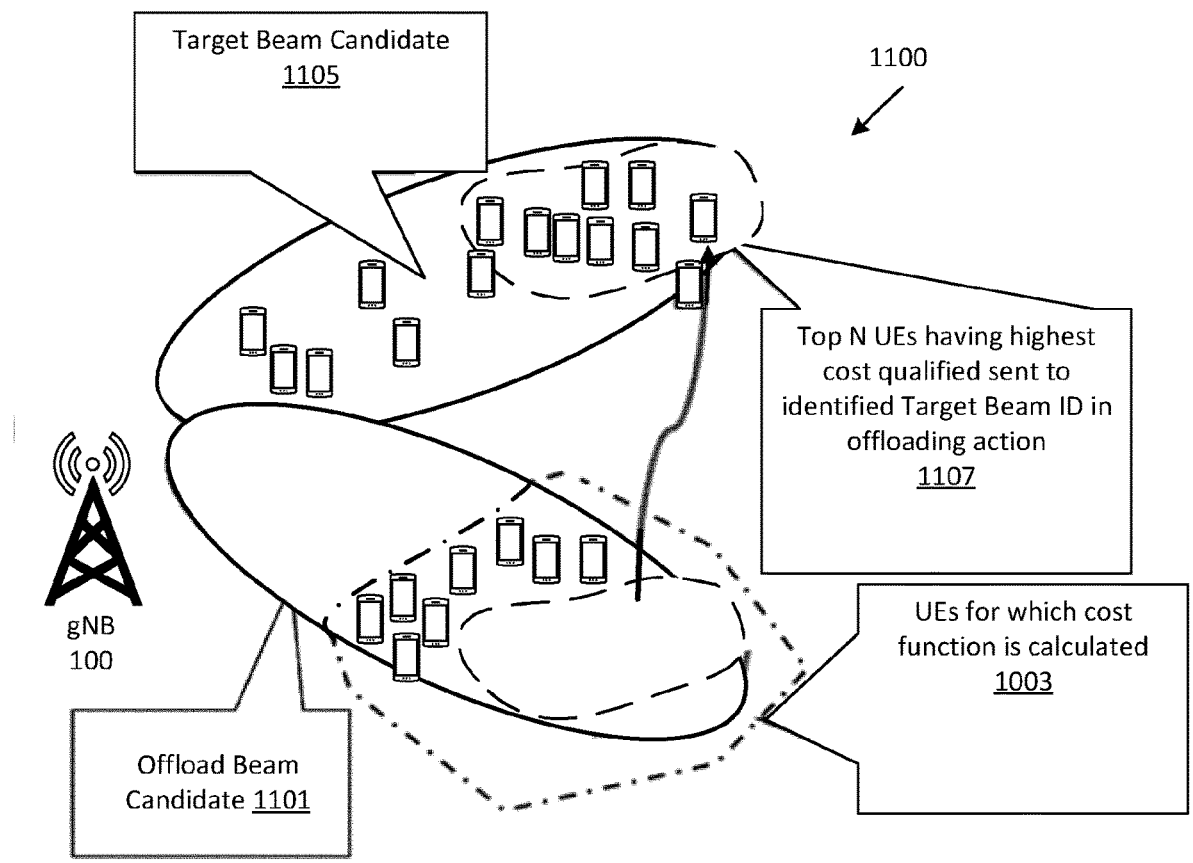
FIG. 11 is a diagram illustrating an exemplary embodiment of results after offloading in accordance with some embodiments of the present disclosure.

FIG. 11 is a diagram 1100 illustrating an exemplary embodiment of results after offloading in accordance with some embodiments of the present disclosure. In the exemplary embodiment of FIG. 11, offload beam candidate 1101 includes, in area 1001, communication devices 102 for which a cost function is calculated. The top N communication devices 102 having the highest costs qualified, from area 1001, are sent to an identified target beam candidate ID in an offloading action 1107.

Figure 12:
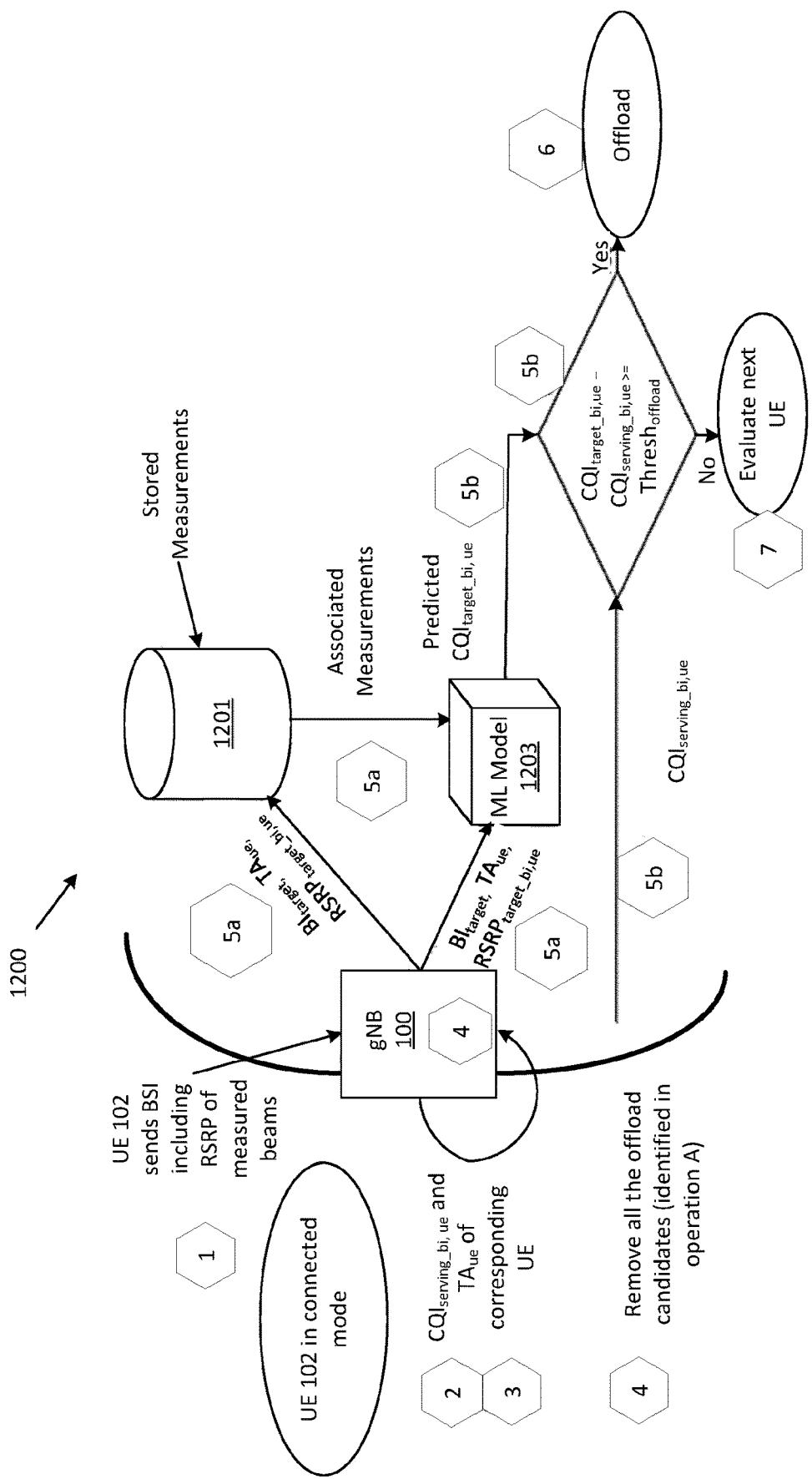
FIG. 12 is diagram illustrating an exemplary embodiment of a flow of operations from a gNB perspective in accordance with some embodiments of the present disclosure.

FIG. 12 is diagram 1200 illustrating an exemplary embodiment of a flow of operations from gNB 100 perspective in accordance with some embodiments of the present disclosure. Referring to FIG. 12, at operation 1, communication device 102 in connected mode sends a BSI containing $RSRP_{target\_bi,ue}$ of measured beam indexes to gNB 100. At operations 2 and 3, gNB 100 collects communication device 102 reported CQI for the serving beam (denoted by $CQI_{serving\_bi,ue}$) and communication device 102 reported Timing Advance ($TA_{ue}$).

Still referring to FIG. 12, at operation 4, gNB 100 removes all offload beam candidates identified in operation A. At operation 5a, inputs from gNB 100 are input to ML model 1203. The inputs include measurements $BI_{target}$, $TA_{ue}$, and $RSRP_{target\_bi,ue}$. Periodically, gNB 100 also sends the inputs to memory 1201, where the measurements are stored along with associated measurements (discussed further below). Inputs $BI_{target}$, $TA_{ue}$, and $RSRP_{target\_bi,ue}$ and associated measurements from memory 1201 are input to ML model 1203.

Still referring to FIG. 12, in operation 5b, for target candidates available after the filtering of operation 4, ML model 1203 predicts the CQI of each target candidate. gNB 100 identifies the target candidates with highest CQI (denoted by $CQI_{target\_bi,ue}$). If $(CQI_{target\_bi,ue} - CQI_{serving\_bi,ue}) >= Thresh_{offload}$, then offload (or beam switch) is initiated in operation 6 of the selected communication device to the target candidate. Otherwise, in operation 7, no action is taken on that communication device and the next communication device 102 is evaluated.

Further description of a ML model will now be discussed.

In various embodiments of the present disclosure, a ML Model can be used to predict a CQI of possible target beam candidates to which communication devices can be offloaded. gNB 100 can collect and use the following exemplary information, which can be used in the prediction method of various embodiments of the present disclosure: (1) Target Beam Index (denoted herein as $BI_{target}$); (2) TA reported by a communication device (denoted herein as $TA_{ue}$); (3) RSRP reported by the communication device for the target BI (part of BSI) (denoted herein by $RSRP_{target\_bi,ue}$), etc.

$BI_{target}$, $TA_{ue}$ and $RSRP_{target\_bi,ue}$ can be used to query a historical data record maintained by gNB 100 or memory

1201 for each BI, RSRP and TA combination (e.g., used as primary key performance indicators) and to fetch corresponding stored measurements (also referred to herein as associated measurements) from memory 1201, examples of which are as follows: (1) physical uplink shared channel (PUSCH) SINR; (2) hybrid automatic repeat request (HARQ) DL not-acknowledged (NACK) Ratio; (3) HARQ Failure Rate; (4) radio link control (RLC) DL NACK Ratio; (5) Ratio of power restricted transport block, etc.

After receiving the above exemplary information (illustrated in operation 5a in FIG. 12), the following exemplary information can be input to the ML model as features: (1) Target Beam Index (denoted herein as $BI_{target}$); (2) TA reported by the communication device (denoted herein as $TA_{ue}$); (3) RSRP reported by the communication device for the target BI (part of BSI) (denoted herein as $RSRP_{target\_bi,ue}$); (4) PUSCH SINR; (5) HARQ DL NACK Ratio; (6) HARQ Failure Rate; (7) RLC DL NACK Ratio; (8) Ratio of power restricted transport block, etc.

Based on the inputs, ML model 1203 can predict the CQI of the target beam candidate BI for the given candidate communication device 102.

Feature selection for a ML model will now be discussed.

To identify suitable features for CQI prediction, some embodiments of the present disclosure use PM scanner-based communication device level values of various measurements. With a mix of domain knowledge and a combination of correlation matrix and Chi-Squared score, a suitable first set of features can be identified (e.g., the examples provided herein). During ML model testing, iterative trial and error also can be applied to determine a set of features. Min-max scaler can be used for scaling purposes.

Figure 13:
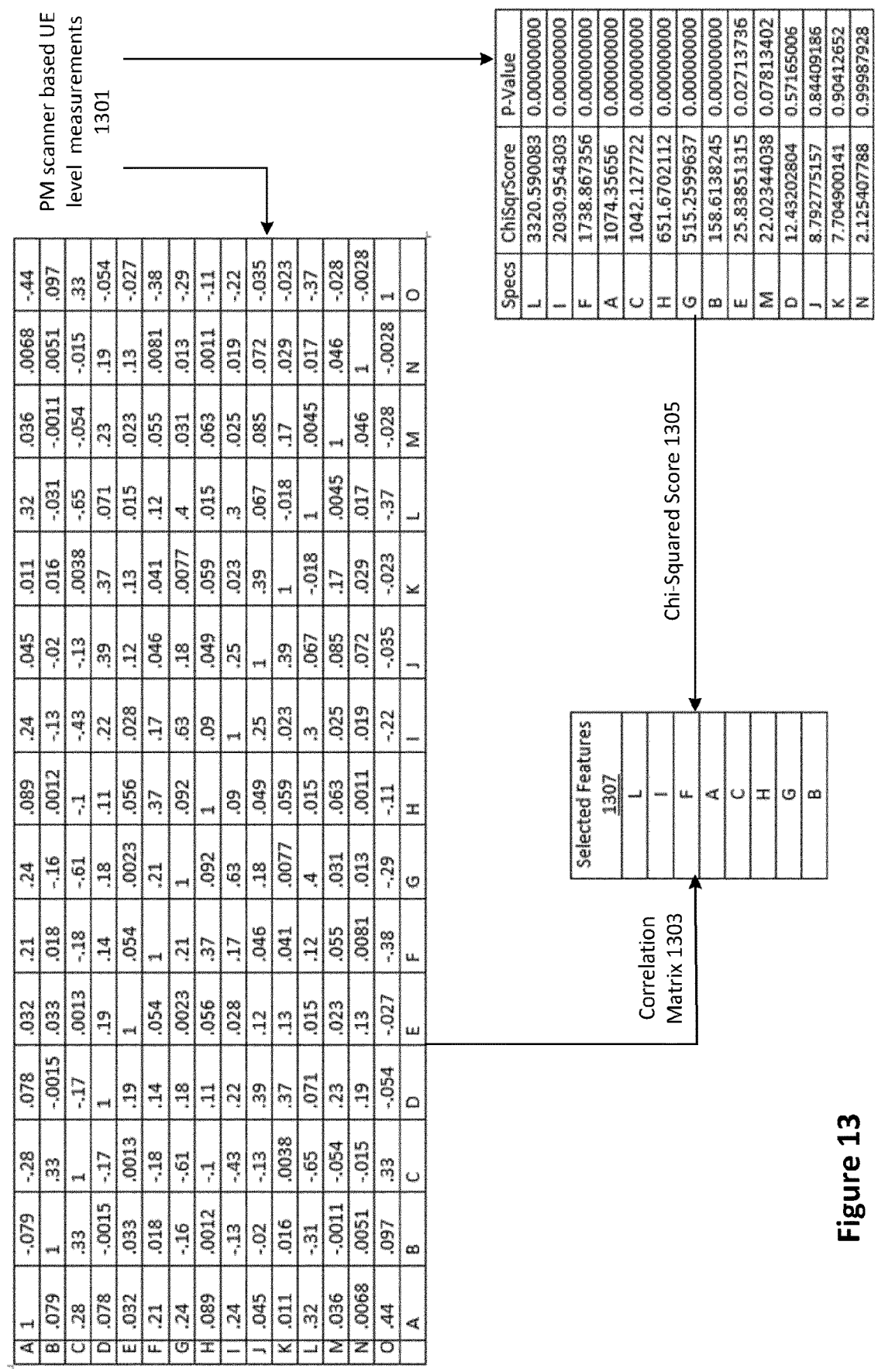
FIG. 13 is diagram of an exemplary embodiment of feature selection and refinement for a ML model in accordance with some embodiments of the present disclosure.

FIG. 13 is diagram of an exemplary embodiment of feature selection and refinement for a ML model in accordance with some embodiments of the present disclosure. PM scanner-based communication device level values of various measurements 1301 can be provided to correlation matrix 1303 and Chi-squared score matrix 1305. The various measurements can include, without limitation, measurement values of features denoted A-O in FIG. 13. Exemplary features A-O are identified in the following Table 1:

|   | Feature Name | Description |
|---|---|---|
| A | TA | Timing advance indicating the radial distance of the UE from the serving cell |
| B | RSRP | Based on UE measurement report, indicates DL coverage |
| C | PUSCH_SINR | Recorded in eNB using PM event, indicates UL SINR on shared channel. |
| D | RLCPOLL_RETX_DL | RLC_POLL_RETX_DL is the total number of occurrences when poll retransmit timer expiry triggers a DL AM PDU retransmission |
| E | RLCPOLL_RETX_UL | RLC_POLL_RETX_UL is the total number of occurrences when poll retransmit timer expiry triggers a UL AM PDU retransmission |
| F | HRQDLNACKRATIO | HARQDLNACKRATIO = HARQ_DL_NACK/(HARQ_DL_NACK + HARQ_DL_ACK)The total number of successful HARQ transmissions in the downlink direction using a QPSK/16QAM/64QAM modulation. HARQ_DL_NACK - Failure is based on the HARQ NACK from UE. Only the Primary Component Carrier traffic contribution (aka PCell) is included. HARQ_DL_ACK) - Success is based on the HARQ ACK from UE. Only the Primary Component Carrier traffic contribution (aka PCell) is included. |
| G | HRQFAILURERATE | HARQFAILURERATE = HARQ_FAIL/(HARQ_FAIL + HARQ_SUCC) The total number of successful HARQ transmissions in the uplink direction using a QPSK/16QAM modulation. HARQ_SUCC - Success is based on the CRC check, not based on if, RBS sends HARQ ACK (RBS can use the ACK even if the transport block was not successfully decoded in a way to control the HARQ) only the Primary Component Carrier traffic contribution (aka PCell) is included. HARQ_FAIL - Failure is based on the CRC check (which will result in an NACK). Only the Primary Component Carrier traffic contribution (aka PCell) is included. |
| H | RLCDLNACKRATIO | RLC_NACK_DL/(RLC_NACK_DL + RLC_ACK_DL) where RLC_NACK_DL - The total number of unsuccessful RLC PDU and RLC PDU segment transmissions (NACKs) in the downlink direction. RLC_ACK_DL - The total number of successful RLC PDU transmissions (ACKs) in the downlink direction. |
| I | RLCULNACKRATIO | "RLC_NACK_UL/(RLC_NACK_UL + RLC_ACK_UL) NACK - The total number of unsuccessful RLC PDU and RLC PDU segment transmissions (NACKs) in the uplink direction. ACK - The total number of successful RLC PDU transmissions (ACKs) in the uplink direction." |
| J | MACDTX_UL | The total number of occasions when an downlink HARQ feedback was not received from an UE for a Transport Block and DTX is considered the reason. Only the secondary component carrier traffic (aka SCell) is included, i.e. the UE has another cell as its primary component carrier (PCell). |
| K | MACDTX_DL | The total number of occasions when an uplink grant was meant for HARQ transmission in the uplink direction, where DTX is considered the reason for no reception of HARQ in uplink in the eNB. Only the secondary component carrier traffic (aka SCell) is included, i.e. the UE has another cell as its primary component carrier (PCell). |
| L | TBSPWRRSTRATIO | The ratio of Transport Blocks on MAC level scheduled in uplink where the UE was considered to be power limited to total number of Transport Blocks on MAC level scheduled in uplink. |

-continued

| | Feature Name | Description |
|---|---|---|
| M | DLPACKETLOST | Number of DL PDCP SDUS transmitted unsuccessfully for DRBs |
| N | ULPACKETLOST | Number of UL PDCP SDUS transmitted unsuccessfully for DRBs |
| O | CQI | Based on UE feedback, indicates DL quality (Channel Quality Index) |

The measurement values of each of features A-O can range from less than −1 to 1, as illustrated in correlation matrix 1303. Based on correlation matrix 1303 and the features having a P-value of 0.00000000 from Chi-squared score matrix 1305, features L, I, F, A, C, H, G, and B are included in exemplary selected features 1307 for the CQI prediction.

A further description of a ML model and exemplary test results will now be discussed.

Figure 14:
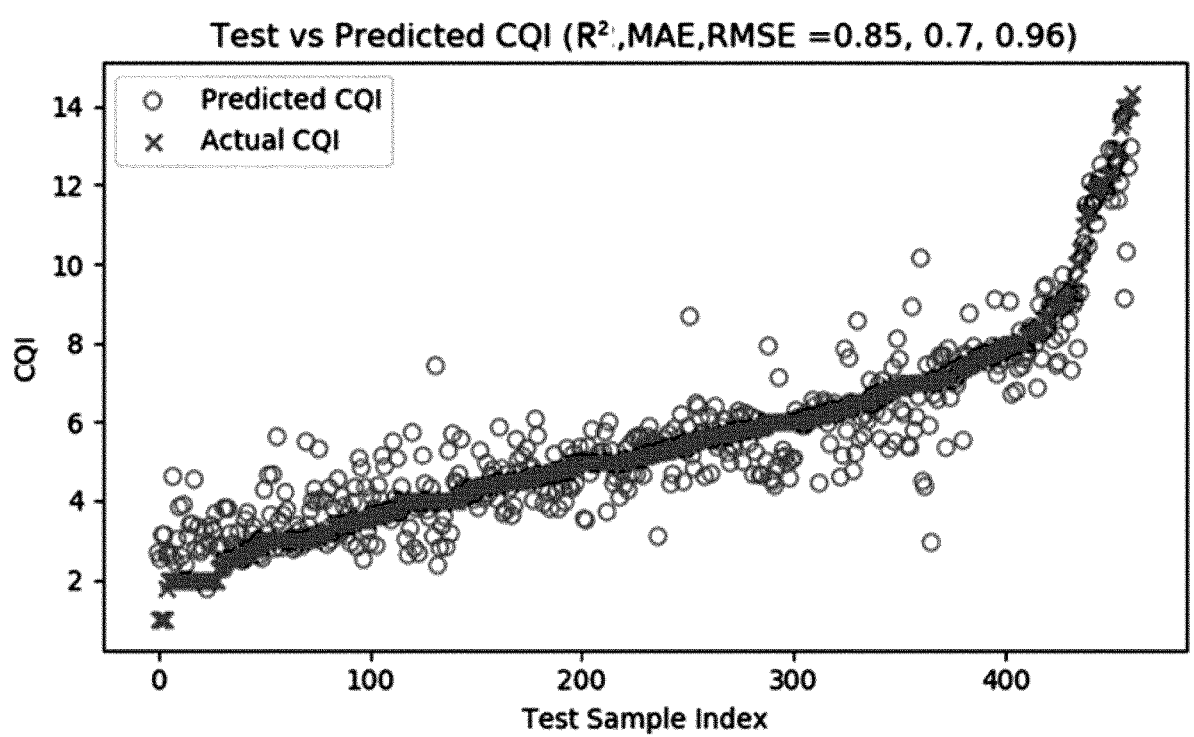
FIG. 14 is a plot of exemplary model test results in accordance with some embodiments of the present disclosure.

The ML model can use Random Forest Regressor from SKLearn. FIG. 14 is a plot illustrating prediction results for test samples using a Random Forest Regressor ML model from SKLearn. Referring to FIG. 14, test results from the ML model are plotted for a test sample index on the x-axis versus CQI on the y-axis. The results are plotted for predicted CQI and actual CQI. The exemplary test results of FIG. 14 can be summarized as follows: (1) $R^2$=0.85; (2) Mean Absolute Error (MAE)=0.7; and (3) Root mean squared error (RMSE)=0.96, as shown on the top of the plot of FIG. 14.

Various embodiments of the present disclosure include a method of distributing communication devices over physical CSI-RS ports. The method may result in optimal, improved or maintained end-user experience and improved system performance by reducing the bias on the communication device reported beam indexes and considering additional metrics that have influence on system performance integrity, realized in form of gNB functionality. The method of various embodiments of the present disclosure may result in load balancing that can be effectively achieved using Layer 1 and Layer 2 procedures only without requiring intervention of higher layers. As a consequence, the method may be swift and light.

Figure 15:
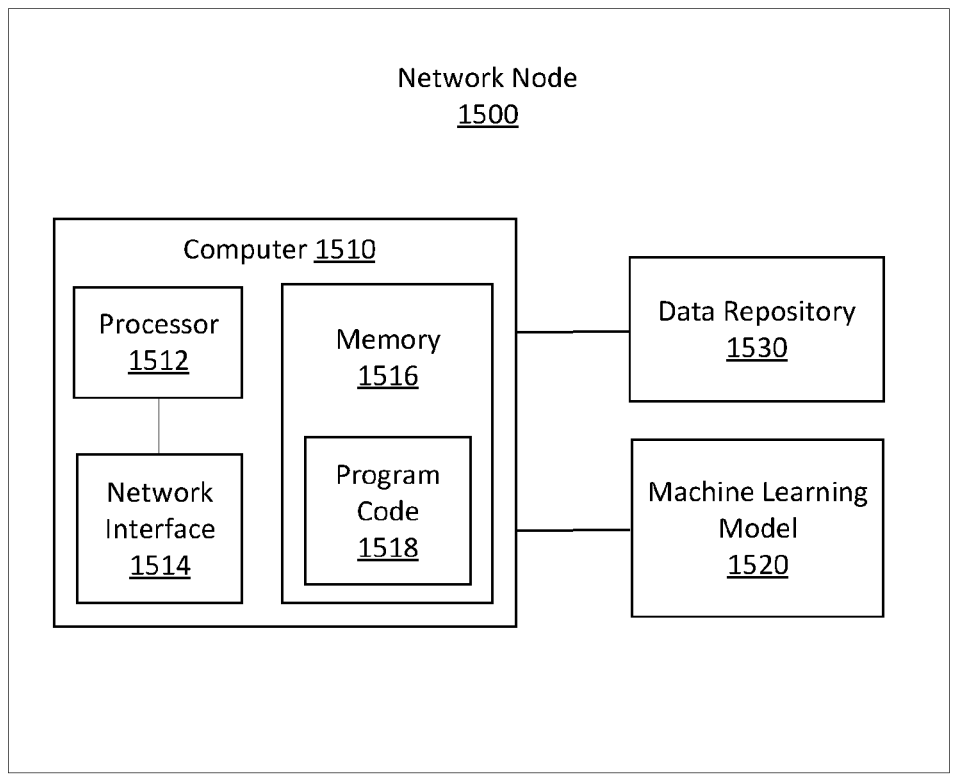
FIG. 15 is a block diagram illustrating a network node (e.g., a base station gNB) in accordance with some embodiments of the present disclosure.

Now that the operations of the various components have been described, operations specific to a network node 1500 (implemented using the structure of the block diagram of FIG. 15) for performing a computer-implemented method for adaptive beam management for load balancing a plurality of communication devices over ports used for a channel state information reference signal, CSI-RS, in a telecommunications network will now be discussed with reference to the flow charts of FIGS. 17 and 18 according to various embodiments of the present disclosure. As shown, network node 1500 may include network interface circuitry 1514 (also referred to as a network interface) configured to provide communications with other nodes of the network and/or the radio access network RAN. Network node 1500 may also include a processing circuitry 1512 (also referred to as a processor) coupled to the network interface circuitry, and memory circuitry 1516 (also referred to as memory) coupled to the processing circuitry 1512. Network node 1500 may also include machine learning model 1520 and data repository 1530 coupled to the network interface circuitry, and memory 1516 coupled to the processing circuitry 1512. The memory circuitry 916 and/or data repository 1530 may include computer readable program code that when executed by the processing circuitry 912 and/or machine learning model 1520 causes the processing circuitry 912 and/or machine learning model 1520 to perform operations. Further, modules may be stored in memory 916, and these modules may provide instructions so that when the instructions of a module are executed by respective computer processing circuitry of processor 1512 and/or machine learning model 1520, processing circuitry of processor 1512 and/or machine learning model 1520 performs respective operations of the flow charts of FIGS. 17 and 18 according to embodiments disclosed herein.

As discussed herein, operations of the network node 1500 may be performed processor 1512, machine learning model 1520 and/or network interface circuitry 1514. For example, machine learning model 1520 and/or processor 1512 may control network interface circuitry 1514 to transmit communications through network interface circuitry 1514 to one or more other network nodes or communication devices, and/or to receive communications through network interface circuitry from one or more other network nodes or communication devices. Each of the operations described in FIGS. 17 and 18 can be combined and/or omitted in any combination with each other, and it is contemplated that all such combinations fall within the spirit and scope of this disclosure.

Figure 16:
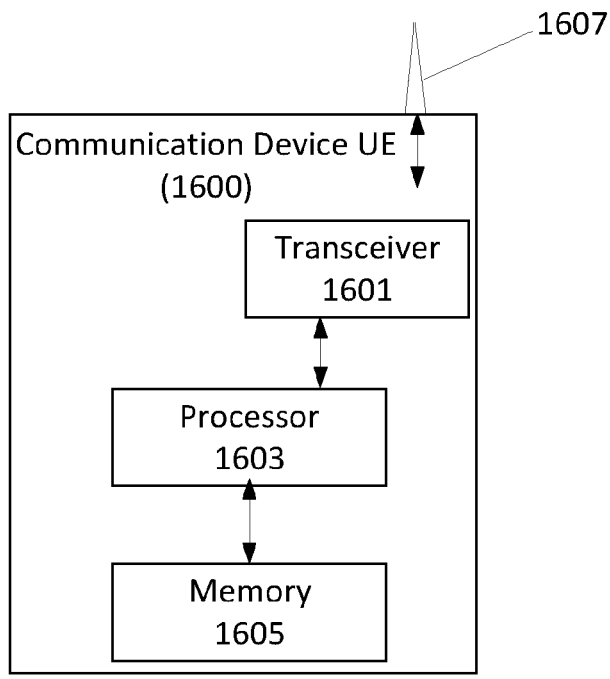
FIG. 16 is a block diagram illustrating a communication device (e.g., a UE) in accordance with some embodiments of the present disclosure.

FIG. 16 is a block diagram illustrating a communication device 1600 that is configured according to some embodiments. The communication device 1600 can include, without limitation, a wireless terminal, a wireless communication device, a wireless communication terminal, a terminal node/UE/device, etc. The communication device 1600 includes a transceiver 1601 comprising one or more power amplifiers that transmit and receive through antennas of an antenna 1607 to provide uplink and downlink radio communications with a radio network node (e.g., a base station, eNB, gNB, etc.) of a telecommunications network. Instead of or in addition to the transceiver 1601, the communication device 1600 may include a light reception front-end configured to receive light signaling such from a Light WiFi AP. Communication device 1600 further includes a processor circuit 1603 (also referred to as a processor) coupled to the transceiver 1601 and a memory circuit 1605 (also referred to as memory). The memory 1605 stores computer readable program code that when executed by the processor 1603 causes the processor 1603 to perform operations according to embodiments disclosed herein.

Figure 18:
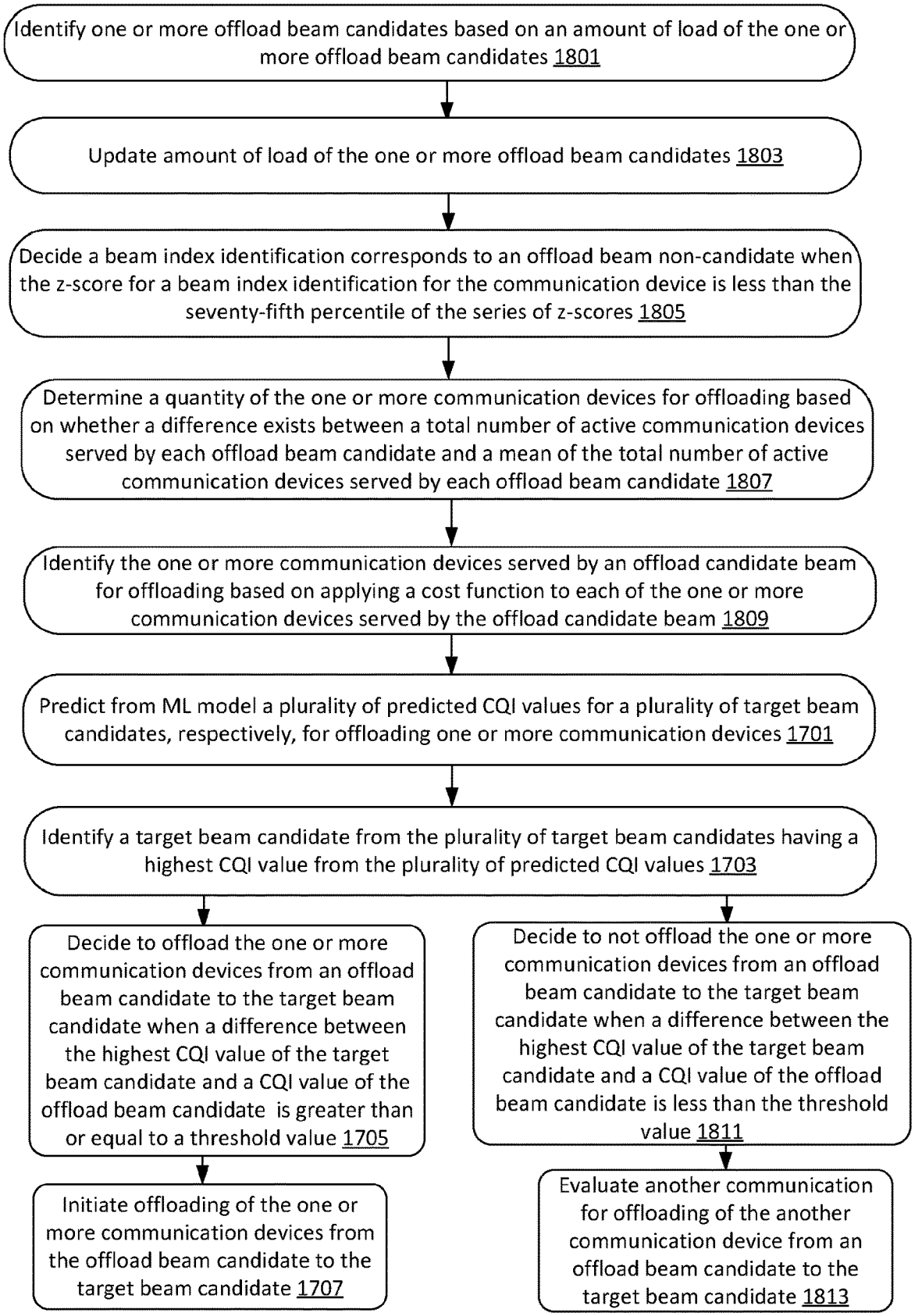

Referring to FIGS. 17 and 18, a computer-implemented method performed by a network node is provided for adaptive beam management for load balancing a plurality of communication devices over ports used for a channel state information reference signal, CSI-RS, in a telecommunications network. The method includes predicting from a machine learning model a plurality of predicted channel quality indicator, CQI, values for a plurality of target beam candidates, respectively, for offloading one or more communication devices from the plurality of communication devices. The method further includes identifying a target beam candidate from the plurality of target beam candidates having a highest CQI value from the plurality of predicted CQI values. The method further includes deciding to offload the one or more communication devices from an offload beam candidate to the target beam candidate when a difference between the highest CQI value of the target beam candidate and a CQI value of the offload beam candidate is greater than or equal to a threshold value. The method further includes, responsive to the deciding, initiating offloading of the one or more communication devices from the offload beam candidate to the target beam candidate.

In some embodiments, a machine processor (e.g., 1512 and/or 1520) including processing circuitry is included in, or is in communication with, machine learning model (e.g., 1520) of the network node (e.g., 1500) for providing adaptive beam management for load balancing the plurality of communication devices over ports used for the CSI-RS. The machine processor can include at least one of a cognitive layer and a machine learning model. The machine learning model includes an unsupervised machine learning model.

In some embodiments, the predicting includes inputting a plurality of measurements for a communication device to the machine learning model. The plurality of measurements include (1) historical data reported by the communication device to the network node including a target beam index, a timing advance, and a reference signal received power, RSRP, for the target beam index. The target beam index identifies a target beam candidate; and (2) at least one stored measurement associated with the target beam index for the timing advance and the RSRP. The predicting (1711) further includes an output from the machine learning model comprising a predicted CQI value of the target beam candidate for the communication device.

In some embodiments, the machine learning model comprises a random forest regression model.

In some embodiments, the method further includes deciding to not offload the one or more communication devices from an offload beam candidate to the target beam candidate when a difference between the highest CQI value of the target beam candidate and a CQI value of the offload beam candidate is less than the threshold value. The method further includes, responsive to the deciding, evaluating another communication device for offloading of the another communication device from an offload beam candidate to the target beam candidate.

In some embodiments, the evaluating comprises sequentially or simultaneously evaluating whether to offload the another communication device from an offload beam candidate to the target beam candidate.

In some embodiments, the method further includes identifying one or more offload beam candidates based on an amount of load of the one or more offload beam candidates.

In some embodiments, the identifying one or more offload beam candidates based on an amount of load of the one or more offload beam candidates comprises accessing a set of records for a physical cell identity of the network node. The set of records include for each of the one or more communication devices one or more of a beam index identification, a CQI, an uplink signal to interference plus noise ratio, and a downlink and/or uplink data volume for each of the one or more communication devices having a connection to the network node.

In some embodiments, the method further includes updating the amount of load of the one or more offload beam candidates. The updating includes a periodic update defined by an interval of time between two consecutive CSI-RS for a communication device from the one or communication devices.

In some embodiments, the identifying one or more offload beam candidates based on an amount of load of the one or more offload beam candidates includes: deriving a series of z-scores for each beam index identification having one or more active communication device served by each beam in the set of records; and deciding a beam index identification comprises an offload beam candidate when a z-score for the beam index identification for a communication device from the one or more communication devices is greater than a seventy-fifth percentile of the series of z-scores.

In some embodiments, the method further includes deciding a beam index identification corresponds to an offload beam non-candidate when the z-score for a beam index identification for a communication device from the one or more communication devices is less than the seventy-fifth percentile of the series of z-scores.

In some embodiments, the method further includes, for each offload beam candidate, determining a quantity of the one or more communication devices for offloading based on whether a difference exists between a total number of active communication devices served by each offload beam candidate and a mean of the total number of active communication devices served by each offload beam candidate. The one or more communication devices includes a communication device included in the quantity when the difference exists, and the communication device is omitted from the quantity when the difference is absent.

In some embodiments, the method further includes identifying the one or more communication devices served by an offload beam candidate for offloading from the offload beam candidate to the target beam candidate based on applying a cost function to each of the one or more communication devices served by the offload beam candidate. The cost function includes a cost value based on weighted metrics for each of the one or more communication devices served by the offload beam candidate.

In some embodiments, the metrics comprise a CQI, an uplink signal to interference plus noise ratio, and a data volume.

In some embodiments, the identifying includes selecting the quantity of the one or more communication devices for offloading having the highest cost values for offloading.

Various operations from the flow chart of FIG. 18 may be optional with respect to some embodiments of a computer-implemented method for adaptive beam management for load balancing a plurality of communication devices over ports used for a channel state information reference signal, CSI-RS, in a telecommunications network, and related methods. For example, operations of blocks 1801-1809 and blocks 1811-1813 of FIG. 18 may be optional.

Figure 19:
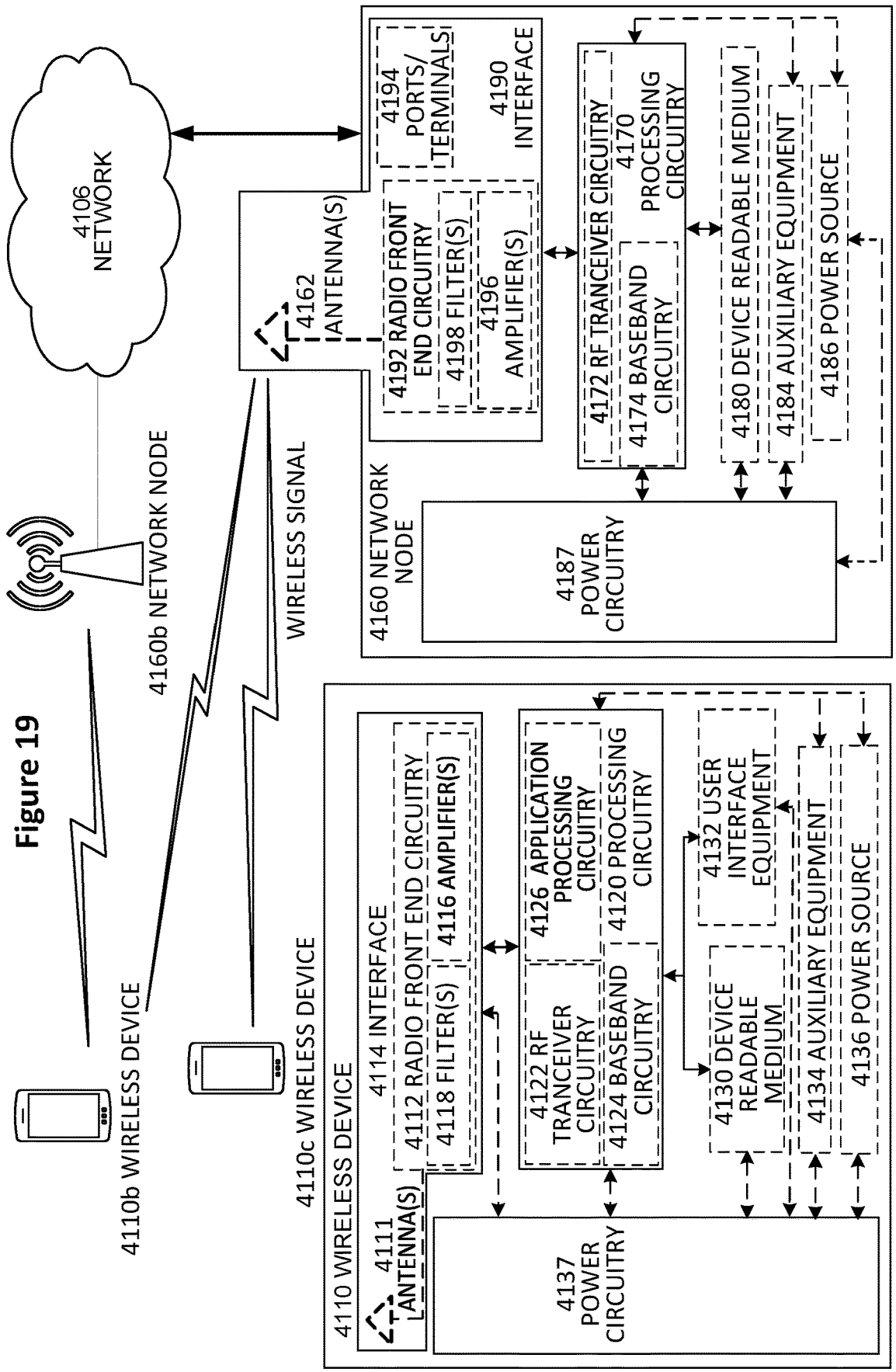
FIG. 19 is a block diagram of a wireless network in accordance with some embodiments of the present disclosure.

FIG. 19 is a block diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 19. For simplicity, the wireless network of FIG. 19 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, core nodes, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O & M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 19, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 19 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In some embodiments, network node 4160 may be configured to support multiple radio access technologies (RATs). Network node 4160 may also include multiple sets of the various illustrated components for different wireless technologies integrated into network node 4160, such as, for example, GSM, WCDMA, LTE, NR, WiFi, or Bluetooth wireless technologies.

Processing circuitry 4170 is configured to perform any determining, calculating, or similar operations (e.g., certain obtaining operations) described herein as being provided by a network node.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality.

In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4190 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz.

Antenna 4162, interface 4190, and/or processing circuitry 4170 may be configured to perform any receiving operations and/or certain obtaining operations described herein as being performed by a network node.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160.

Alternative embodiments of network node 4160 may include additional components beyond those shown in FIG. 19 that may be responsible for providing certain aspects of the network node's functionality, including any of the functionality described herein and/or any functionality necessary to support the subject matter described herein.

As used herein, user equipment (UE) or communication device refers to a device capable, configured, arranged and/or operable to communicate wirelessly with network nodes and/or other wireless devices. Unless otherwise noted, the term UE may be used interchangeably herein with user equipment, user device, communication device, and/or wireless device (WD). Communicating wirelessly may involve transmitting and/or receiving wireless signals using electromagnetic waves, radio waves, infrared waves, and/or other types of signals suitable for conveying information through air. In some embodiments, a UE may be configured to transmit and/or receive information without direct human interaction. For instance, a UE may be designed to transmit information to a network on a predetermined schedule, when triggered by an internal or external event, or in response to requests from the network. Examples of a UE include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A UE may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a UE may represent a machine or other device that performs monitoring and/or measurements, and transmits the results of such monitoring and/or measurements to another UE and/or a network node. The UE may in this case be a machine-to-machine (M2M) device, which may in a 3GPP context be referred to as an MTC device. As one particular example, the UE may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a UE may represent a vehicle or other equipment that is capable of monitoring and/or reporting on its operational status or other functions associated with its operation. A UE as described above may represent the endpoint of a wireless connection, in which case the device may be referred to as a wireless terminal. Furthermore, a UE as described above may be mobile, in which case it may also be referred to as a mobile device or a mobile terminal.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable.

In the above description of various embodiments of the present disclosure, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

Explanations are provided below for various abbreviations/acronyms used in the present disclosure.

| Abbreviation | Explanation |
| --- | --- |
| $BI_{target}$ | Target Beam Index |
| BRSRP | Beam Reference Signal Received Power |
| BSI | Beam Status Indicator |
| CQI | Channel Quality Indicator |
| $CQI_{serving\_bi, ue}$ | UE Reported CQI for the serving beam |
| $CQI_{target\_bi, ue}$ | ML predicted CQI for the target beam |
| $CQI_{ue}$ | UE Reported CQI |
| CSI RS | Channel State Information Reference Signal |
| DATA VOL | Data Volume |
| $DATAVOL_{ue}$ | Data Volume for a UE |
| DL/UL | Downlink/Uplink |

-continued

| Abbreviation | Explanation |
| --- | --- |
| gNB | Logical 5G radio node |
| HARQ | Hybrid automatic repeat request |
| LB | Load Balancing |
| MAE | Mean absolute error |
| MCG | Master Cell Group |
| ML | Machine Learning |
| NR | New Radio |
| PBCH | Physical Broadcast channel |
| PCI | Physical Cell Identity |
| PM | Performance management |
| PosOrientedScale | Positive-oriented normalization of a metric based on population |
| PSS | Primary Synchronization Signal |
| PUSCH | Physical Uplink Shared Channel |
| RAN | Radio Access Network |
| RLC | Radio Link Control |
| RMSE | Root mean squared error |
| RSRP | Reference Signal Received Power |
| $RSRP_{target\_bi, ue}$ | RSRP of the target beam reported by UE |
| SCG | Secondary Cell Group |
| SINR | Signal to Interference plus Noise Ratio |
| SSB | Synchronization signal Block |
| SSS | Secondary Synchronization Signal |
| T1_Decision | Boolean value indicating the offload candidate |
| T1_Offload_Quantity | Quantity of UEs that need to be offloaded from offload candidates |
| $TA_{ue}$ | UE reported Timing Advance |
| $T_{csi}$ | CSI Periodicity |
| $Thresh_{offload}$ | the minimum value of the difference between $CQI_{target\_bi, ue}$ and $CQI_{serving\_bi, ue}$ |
| UE | User Equipment |
| UeCostFunc | A cost function to prioritize UEs for offloading |
| $UE_{count, bi}$ | Total number of active users served by a specific beam |
| UL SINR | Uplink Signal to Noise Ratio |
| $UL\_SINR_{ue}$ | UL SINR for a specific UE |
| $Z_{score, bis}$ | Series of Z-Scores based on $UE_{count, bi}$ for all the beam indexes |

The invention claimed is:

1. A computer-implemented method performed by a network node for adaptive beam management for load balancing a plurality of communication devices over ports used for a channel state information reference signal, CSI-RS, in a telecommunications network, the method comprising:

predicting from a machine learning model a plurality of predicted channel quality indicator, CQI, values for a plurality of target beam candidates, respectively, for offloading one or more communication devices from the plurality of communication devices;

identifying a target beam candidate from the plurality of target beam candidates having a highest CQI value from the plurality of predicted CQI values;

deciding to offload the one or more communication devices from an offload beam candidate to the target beam candidate when a difference between the highest CQI value of the target beam candidate and a CQI value of the offload beam candidate is greater than or equal to a threshold value; and responsive to the deciding, initiating offloading of the one or more communication devices from the offload beam candidate to the target beam candidate.

2. The method of claim 1, wherein the predicting comprises:

inputting a plurality of measurements for a communication device to the machine learning model, wherein the plurality of measurements comprise (1) historical data reported by the communication device to the network node including a target beam index, a timing advance, and a reference signal received power, RSRP, for the target beam index; and (2) at least one stored measurement associated with the target beam index for the timing advance and the RSRP; and an output from the machine learning model comprising a predicted CQI value of the target beam candidate for the communication device.

3. The method of claim 1, wherein the machine learning model comprises a random forest regression model.

4. The method of claim 1, further comprising:
deciding to not offload the one or more communication devices from an offload beam candidate to the target beam candidate when a difference between the highest CQI value of the target beam candidate and a CQI value of the offload beam candidate is less than the threshold value; and
responsive to the deciding, evaluating another communication device for offloading of the another communication device from an offload beam candidate to the target beam candidate.

5. The method of claim 4, wherein the evaluating comprises sequentially or simultaneously evaluating whether to offload the another communication device from the offload beam candidate to the target beam candidate.

6. The method of claim 1, further comprising:
identifying one or more offload beam candidates based on an amount of load of the one or more offload beam candidates.

7. The method of claim 6, wherein the identifying one or more offload beam candidates based on an amount of load of the one or more offload beam candidates comprises accessing a set of records for a physical cell identity of the network node, wherein the set of records comprise for each of the one or more communication devices one or more of a beam index identification, a CQI, an uplink signal to interference plus noise ratio, and a downlink and/or uplink data volume for each of the one or more communication devices having a connection to the network node.

8. The method of claim 6, further comprising;
updating the amount of load of the one or more offload beam candidates, wherein the updating comprises a periodic update defined by an interval of time between two consecutive CSI-RS for a communication device from the one or communication devices.

9. The method of claim 7, wherein the identifying one or more offload beam candidates based on an amount of load of the one or more offload beam candidates comprises:
deriving a series of z-scores for each beam index identification having one or more active communication device served by each beam in the set of records; and
deciding a beam index identification comprises an offload beam candidate when a z-score for the beam index identification for a communication device from the one or more communication devices is greater than a seventy-fifth percentile of the series of z-scores.

10. The method of claim 9, further comprising:
deciding a beam index identification corresponds to an offload beam non-candidate when the z-score for a beam index identification for a communication device from the one or more communication devices is less than the seventy-fifth percentile of the series of z-scores.

11. The method of claim 9, further comprising:
for each offload beam candidate, determining a quantity of the one or more communication devices for offloading based on whether a difference exists between a total number of active communication devices served by each offload beam candidate and a mean of the total number of active communication devices served by each offload beam candidate, wherein the one or more communication devices comprises a communication device included in the quantity when the difference exists and wherein the communication device is omitted from the quantity when the difference is absent.

12. The method of claim 6, further comprising:
identifying the one or more communication devices served by an offload beam candidate for offloading from the offload beam candidate to the target beam candidate based on applying a cost function to each of the one or more communication devices served by the offload beam candidate, wherein the cost function comprises a cost value based on weighted metrics for each of the one or more communication devices served by the offload beam candidate.

13. The method of claim 12, wherein the weighted metrics comprise a CQI, an uplink signal to interference plus noise ratio, and a downlink and/or uplink data volume.

14. The method of claim 12, wherein the identifying comprises selecting the quantity of the one or more communication devices for offloading having the highest cost values for offloading.

15. A network node for adaptive beam management for load balancing a plurality of communication devices over ports used for a channel state information reference signal, CSI-RS, in a telecommunications network, the network node comprising:
at least one processor;
at least one memory connected to the at least one processor and storing program code that is executed by the at least one processor to perform operations comprising:
predicting from a machine learning model a plurality of predicted channel quality indicator, CQI, values for a plurality of target beam candidates, respectively, for offloading one or more communication devices from the plurality of communication devices;
identifying a target beam candidate from the plurality of target beam candidates having a highest CQI value from the plurality of predicted CQI values;
deciding to offload the one or more communication devices from an offload beam candidate to the target beam candidate when a difference between the highest CQI value of the target beam candidate and a CQI value of the offload beam candidate is greater than or equal to a threshold value; and
responsive to the deciding, initiating offloading of the one or more communication devices from an offload beam candidate to the target beam candidate.

16. The network node of claim 15, wherein the operation to predict comprises to:
input a plurality of measurements for a communication device to the machine learning model, wherein the plurality of measurements comprise (1) historical data reported by the communication device to the network node including a target beam index, a timing advance, and a reference signal received power, RSRP, for the target beam index; and (2) at least one stored measurement associated with the target beam index for the timing advance and the RSRP; and
an output from the machine learning model comprising a predicted CQI value of the target beam candidate for the communication device.

17. A computer program product comprising a non-transitory storage medium including program code to be executed by processing circuitry of a network node, whereby execution of the program code causes the network node to perform operations comprising:
- predicting from a machine learning model a plurality of predicted channel quality indicator, CQI, values for a plurality of target beam candidates, respectively, for offloading one or more communication devices from the plurality of communication devices;
- identifying a target beam candidate from the plurality of target beam candidates having a highest CQI value from the plurality of predicted CQI values;
- deciding to offload the one or more communication devices from an offload beam candidate to the target beam candidate when a difference between the highest CQI value of the target beam candidate and a CQI value of the offload beam candidate is greater than or equal to a threshold value; and
- responsive to the deciding, initiating offloading of the one or more communication devices from an offload beam candidate to the target beam candidate.

18. The computer program product of claim 17, whereby execution of the program code causes the network node to perform operations to predict by:
- inputting a plurality of measurements for a communication device to the machine learning model, wherein the plurality of measurements comprise (1) historical data reported by the communication device to the network node including a target beam index, a timing advance, and a reference signal received power, RSRP, for the target beam index; and (2) at least one stored measurement associated with the target beam index for the timing advance and the RSRP; and
- an output from the machine learning model comprising a predicted CQI value of the target beam candidate for the communication device.

* * * * *